(12) United States Patent
Angelov et al.

(10) Patent No.: US 10,747,339 B2
(45) Date of Patent: Aug. 18, 2020

(54) DIGITAL INK CODING METHOD, DIGITAL INK DECODING METHOD, DIGITAL INK DATA STRUCTURE, AND METHOD OF GENERATING FILE INCLUDING DIGITAL INK

(71) Applicant: Wacom Co., Ltd., Saitama (JP)

(72) Inventors: Branimir Angelov, Sofia (BG); Plamen Petkov, Sofia (BG); Naoki Watanabe, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 16/453,656

(22) Filed: Jun. 26, 2019

(65) Prior Publication Data

US 2019/0317616 A1    Oct. 17, 2019

Related U.S. Application Data

(63) Continuation of application No. PCT/JP2017/047025, filed on Dec. 27, 2017.

(Continued)

(51) Int. Cl.
*G06F 3/0354* (2013.01)
*G06F 3/041* (2006.01)
*G06F 3/0488* (2013.01)

(52) U.S. Cl.
CPC ........ *G06F 3/03545* (2013.01); *G06F 3/0412* (2013.01); *G06F 3/0414* (2013.01); *G06F 3/04883* (2013.01); *G06F 2203/04101* (2013.01)

(58) Field of Classification Search
CPC ....... G06F 3/0354; G06F 3/0488; G06F 3/041
See application file for complete search history.

(56) References Cited

U.S. PATENT DOCUMENTS

2016/0308548 A1* 10/2016 Lowe ................. G01D 5/241
2016/0357292 A1* 12/2016 Suzuki ............... G06F 3/0412

(Continued)

FOREIGN PATENT DOCUMENTS

WO     2015/075930 A1    5/2015

OTHER PUBLICATIONS

Ink Markup Language (InkML) disclosed in "Ink Markup Language (InkML)," [online], Sep. 20, 2011, World Wide Web Consortium, [Searched Dec. 6, 2017], Internet <URL: https://www.w3.org/TR/InkML/>.

(Continued)

*Primary Examiner* — Vinh T Lam
(74) *Attorney, Agent, or Firm* — Seed IP Law Group LLP

(57) ABSTRACT

A digital ink coding method includes: a coordinate coding step of acquiring a first binary data indicating a series of sets of x coordinate data and y coordinate data by coding N pieces of position data, each including a set of x coordinate data and y coordinate data acquired in connection with a motion of a pointing device during a period determined by a state of the pointing device; a width coding step of acquiring a second binary data defining widths at positions indicated by N pieces of position data by coding M pieces of width data, where M is an integer equal to or greater than 1 and equal to or smaller than N and the second binary data is separated from the first binary data; and a serialization step of generating a binary stream including the first binary data and the second binary data in mutually different regions.

10 Claims, 15 Drawing Sheets

Related U.S. Application Data

(60) Provisional application No. 62/440,851, filed on Dec. 30, 2016.

(56) References Cited

U.S. PATENT DOCUMENTS

| | | | |
|---|---|---|---|
| 2017/0236021 A1 | 8/2017 | Petkov et al. | |
| 2017/0293826 A1* | 10/2017 | Kemmochi | G06K 9/00402 |
| 2019/0317616 A1* | 10/2019 | Angelov | G06K 9/00416 |

OTHER PUBLICATIONS

International Search Report, dated Feb. 20, 2018, issued in corresponding International Application No. PCT/JP2017/047025, 6 pages (with translation).

Office Open Extensible Markup Language (XML) disclosed in "ISO/IEC 29500-2:2012," [online], Sep. 1, 2012, The International Organization for Standardization, [Searched Dec. 13, 2017], Internet <URL: http://standards.iso.org/ittf/PubliclyAvailableStandards/index.html>.

Scalable Vector Graphics (SVG) disclosed in "SVG 1.1 (Second Edition)," [online], Aug. 16, 2011, World Wide Web Consortium, [Searched Dec. 6, 2017], Internet <URL: http://www.w3.org/TR/SVG/paths.html>.

Windows Ink disclosed in ".NET Framework Class Library," [online], Microsoft Corporation, [Searched Dec. 6, 2017], Internet <URL: https://msdn.microsoft.com/en-us/library/system.windows.ink.stroke(v=vs.110).aspx>.

\* cited by examiner

```
1: message Path {
2:   optional float   startParameter   = 1 [default = 0];
3:   optional float   endParameter     = 2 [default = 1];
4:   optional uint32  decimalPrecision = 3 [default = 2];
5:   repeated sint32  Positions        = 4 [packed = true];
6:   repeated sint32  strokeWidths     = 5 [packed = true];
7:   repeated sint32  strokeColor      = 6 [packed = true];
8: }
```

FIG. 16A

```xml
<?xml version="1.0" encoding="UTF-8"?>
<Relationships
xmlns="http://schemas.openxmlformats.org/package/2006/relationships">
<Relationship Id="core-properties" Type="http://schemas.openxmlformats.org/package/2006/relationships/metadata/core-properties" Target="/props/core.xml"/>
<Relationship Id="extended-properties" Type="http://schemas.willifileformat.org/2015/relationships/extended-properties" Target="/props/app.xml"/>
<Relationship Id="section0" Type="http://schemas.willifileformat.org/2015/relationships/section" Target="/sections/section0.svg"/>
</Relationships>
```

FIG. 16B

```xml
<?xml version="1.0" encoding="UTF-8"?>
<coreProperties
xmlns="http://schemas.openxmlformats.org/package/2006/relationships/metadata/core-properties"
xmlns:dc="http://purl.org/dc/elements/1.1/"
xmlns:dcterms="http://purl.org/dc/terms/"
xmlns:xsi="http://www.w3.org/2001/XMLSchema-instance">
<dcterms:created xsi:type="dcterms:W3CDTF">2016-05-12T16:46:34Z</dcterms:created>
<dc:title>Document_name_00074</dc:title>
<dc:creator>Author_name_0001</dc:creator>
</coreProperties>
```

FIG. 16C

```xml
<?xml version="1.0" encoding="UTF-8"?>
<Properties
xmlns="http://schemas.willifileformat.org/2015/relationships/extended-properties">
<Application>Digital Ink editor</Application>
<AppVersion>1.0</AppVersion>
</Properties>
```

FIG. 17A

```
<?xml version="1.0" encoding="UTF-8"?>
<Relationships
xmlns="http://schemas.openxmlformats.org/package/2006/relationships">
  <Relationship Id="strokes0" Type="http://schemas.willfileformat.org/2015/relationships/section/paths" Target="/sections/media/paths0.protobuf"/>
</Relationships>
```

FIG. 17B

```
<?xml version="1.0" encoding="UTF-8"?>
<svg
xmlns="http://www.w3.org/2000/svg"
xmlns:r="http://schemas.willfileformat.org/2015/relationships" width="592.0" height="840.0">
  <rect fill="#FFFFFF" fill-opacity="1.0" width="592.0" height="840.0"/>
  <g transform="matrix(1.0 0.0 -0.0 1.0 0.0 0.0)">
    <g r:id="strokes0"/></g>
</svg>
```

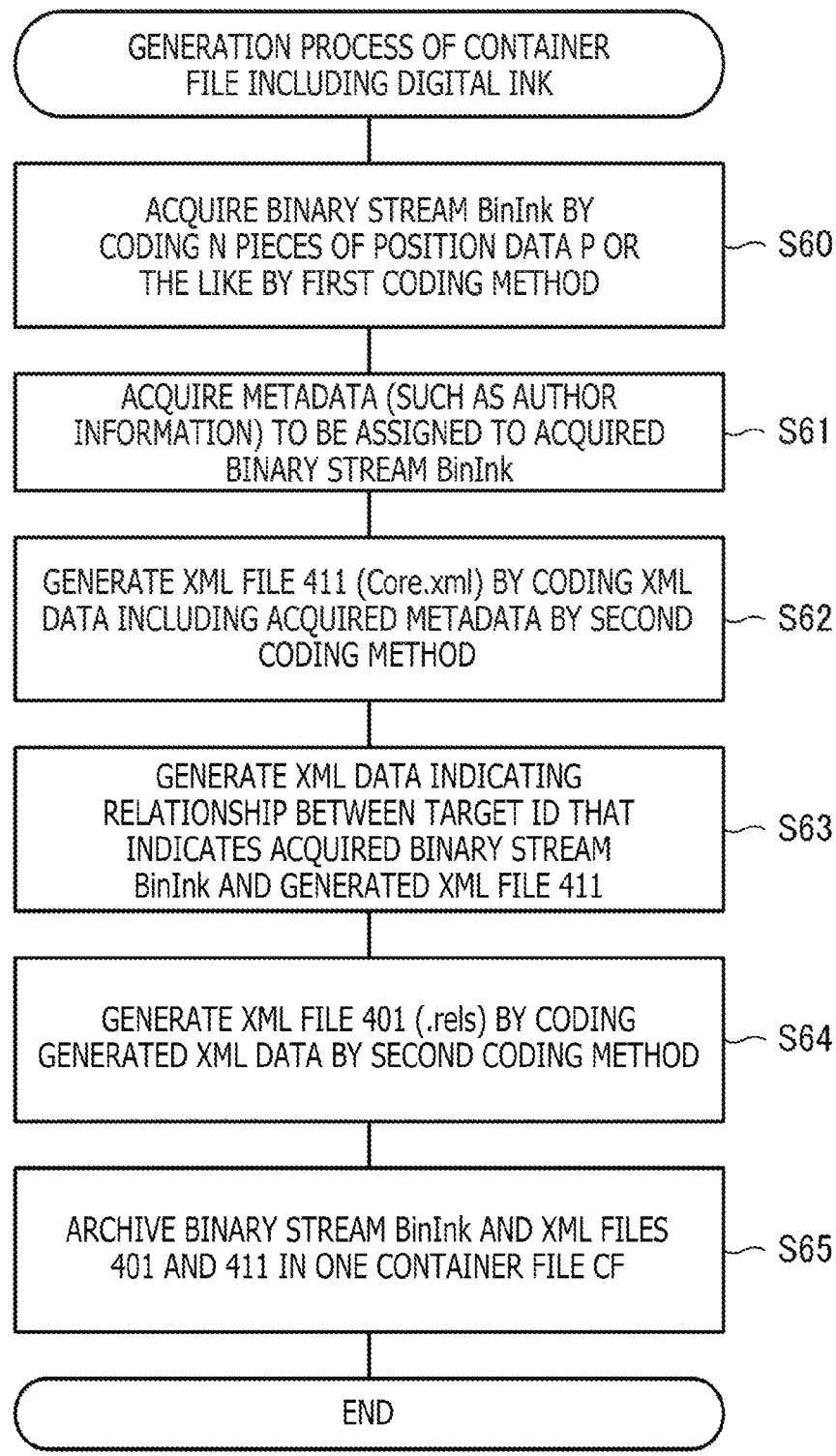

DIGITAL INK CODING METHOD, DIGITAL INK DECODING METHOD, DIGITAL INK DATA STRUCTURE, AND METHOD OF GENERATING FILE INCLUDING DIGITAL INK

BACKGROUND OF THE INVENTION

1. Field of the Invention

The present invention relates to a digital ink coding method, a digital ink decoding method, a digital ink data structure, and a method of generating a file including digital ink.

2. Description of the Related Art

Moving an ink-filled pen or a paint-applied brush on a paper sheet causes ink or paint to be absorbed or accumulated on the paper sheet to draw a path. Digital ink is data obtained by converting a movement path of an indicator, such as an electronic pen or a stylus, on a coordinate detection device such as a tablet into electronic data, so as to simulate a handwritten path (stroke) drawn on a paper sheet. PCT Patent Publication No. WO2015/075930 (hereinafter referred to as Patent Document 1) and U.S. Patent Application Publication No. 2017/0236021 (hereinafter referred to as Patent Document 2) disclose examples of such digital ink.

As disclosed in Patent Document 1, the digital ink normally includes vector data for reproducing a handwritten path and data for describing a drawing style for the path. As digital ink's specific formats, Scalable Vector Graphics (SVG) disclosed in "SVG 1.1 (Second Edition)," [online], Aug. 16, 2011, World Wide Web Consortium, [Searched Dec. 6, 2017], Internet <URL: http://www.w3.org/TR/SVG/paths.html> (hereinafter referred to as Non-Patent Document 1); Windows Ink disclosed in ".NET Framework Class Library," [online], Microsoft Corporation, [Searched Dec. 6, 2017], Internet <URL: https://msdn.microsoft.com/en-us/library/system.windows. ink.stroke(v=vs.110).aspx> (hereinafter referred to as Non-Patent Document 2); Ink Markup Language (InkML) disclosed in "Ink Markup Language (InkML)," [online], Sep. 20, 2011, World Wide Web Consortium, [Searched Dec. 6, 2017], Internet <URL: https://www.w3.org/TR/InkML/> (hereinafter referred to as Non-Patent Document 3); Office Open Extensible Markup Language (XML) disclosed in "ISO/IEC 29500-2:2012," [online], Sep. 1, 2012, The International Organization for Standardization, [Searched Dec. 13, 2017], Internet <URL: http://standards.iso.org/ittf/PubliclyAvailableStandards/index.html> (hereinafter referred to as Non-Patent Document 4); and the like are known. Each of these formats is a data format standardized to be available in diverse environments (a drawing application, a document creation application, and the like running on various operating system (OS)).

SUMMARY OF THE INVENTION

According to an aspect, digital ink coding is realized such that digital ink can be decoded by the same decoding method regardless of whether a digital ink stroke has a fixed width or a variable width. Further, the number of bits in the digital ink can be reduced in a case in which at least part of a stroke has a fixed width, compared with a case in which an entire stroke has a variable width.

According to another aspect, position data can be coded or decoded per stroke on the basis of precision data associated with the position data (e.g., how precisely the position data is coded), wherein the precision data may vary depending on a coordinate detection device or a stylus. It is therefore possible to place multiple position data having different levels of precision in one digital ink (file).

According to another aspect, metadata can be allocated to a binary stream, which is generated by coding a series of position data that forms a stroke. Such metadata can be realized by a general-purpose notation, such as an XML notation.

A digital ink coding method according to the present disclosure includes: a coordinate coding step of acquiring a first binary data indicating a series of sets of x coordinate data and y coordinate data by coding N pieces of position data, each including a set of x coordinate data and y coordinate data acquired in connection with a motion of a pointing device during a period determined by a state of the pointing device; a width coding step of acquiring a second binary data defining widths at positions indicated by N pieces of position data by coding M pieces of width data, where M is an integer equal to or greater than 1 and equal to or smaller than N and the second binary data is separated from the first binary data; and a serialization step of generating a binary stream including the first binary data and the second binary data in mutually different regions.

The digital ink coding method may further include a precision data coding step of generating a third binary data by coding precision data indicating precision of N pieces of position data, wherein the coordinate coding step may include coding N pieces of position data using the precision data, and the serialization step may include generating the binary stream including the first binary data, the second binary data, and the third binary data in mutually different regions such that the third binary data is placed ahead of the second binary data in a decoding order.

A digital ink decoding method according to the present disclosure reproduces a path of a pointing device from a binary stream including coded digital ink. The digital ink decoding method includes: a position data decoding step of decoding N pieces of position data acquired in connection with a motion of the pointing device during a period determined by a state of the pointing device from a first region in the binary stream; a width data decoding step of decoding M pieces of width data defining widths at positions indicated by N pieces of position data from a second region different from the first region in the binary stream, where M is an integer equal to or greater than 1 and equal to or smaller than N; and a width interpolation step of interpolating a width at a position of each of N-M positions, when M is smaller than N, using any of M pieces of width data.

A digital ink data structure according to the present disclosure includes, in mutually different regions, a first binary data obtained by coding N pieces of position data acquired in connection with a motion of a pointing device during a period determined by a state of the pointing device and a second binary data obtained by coding M pieces of width data defining widths at positions indicated by N pieces of position data, where M is an integer equal to or greater than 1 and equal to or smaller than N, and in a computer executing a decoding method on digital ink having the digital ink data structure, the digital ink data structure is used in a process of: restoring N pieces of position data from the first binary data; restoring M pieces of width data from the second binary data; and associating M pieces of width data with N pieces of position data.

A method of generating a file including coded digital ink according to the present disclosure includes: a first coding step of acquiring a binary stream by using a first coding method to code N pieces of position data acquired in connection with a motion of a pointing device during a period determined by a state of the pointing device; a first metadata binary generation step of generating a first XML file by acquiring metadata for the binary stream and using a second coding method to code first XML data including the metadata; a second metadata binary generation step of generating a second XML file by generating second XML data indicating a relationship between a target identification information indicative of the binary stream and the metadata and using the second coding method to code the second XML data; and a package generation step of archiving the binary stream, the first XML file, and the second XML file in one package file.

With the digital ink coding method, the digital ink decoding method, and the data structure according to the present disclosure, while serialization is executed such that a series of sets of x coordinate data and y coordinate data (as well as z coordinate data) forms one binary data (the first binary data), width data at the positions indicated by the sets of coordinate data is serialized to form a second binary data separated from the first binary data. Thus, the resulting digital ink can be decoded, using the same decoding method, regardless of whether a stroke has a fixed width (M=1) or a variable width (1<M≤N). Further, the number of bits in the digital ink can be reduced in a case in which at least part of a stroke has a fixed width (1≤M<N), compared with a case in which an entire stroke has a variable width (M=N).

Furthermore, with the digital ink coding method, the digital ink decoding method, and the data structure according to the present disclosure, the position data can be coded or decoded per stroke on the basis of the precision data associated with the position data that can vary depending on a coordinate detection device. Therefore, it becomes possible to place multiple position data having different levels of precision in one digital ink (file).

Still further, with the method of generating a file including digital ink according to the present disclosure, it becomes possible to allocate metadata to a binary stream, generated by coding a series of pieces of position data forming a stroke, using a general-purpose notation such as an XML notation.

BRIEF DESCRIPTION OF THE DRAWINGS

FIG. 16A depicts an example of a specific content of a relationship file; FIG. 16B depicts an example of a specific content of an XML file; and FIG. 16C depicts an example of a specific content of another XML file;

FIG. 17A depicts an example of a specific content of another relationship file, and FIG. 17B depicts an example of a specific content of an SVG file; and FIG. 18 is a flowchart of a method of generating the container file according to an embodiment of the present invention.

DETAILED DESCRIPTION OF THE PREFERRED EMBODIMENTS

Embodiments of the present invention will be described hereinafter in detail with reference to the accompanying drawing.

Figure 1:
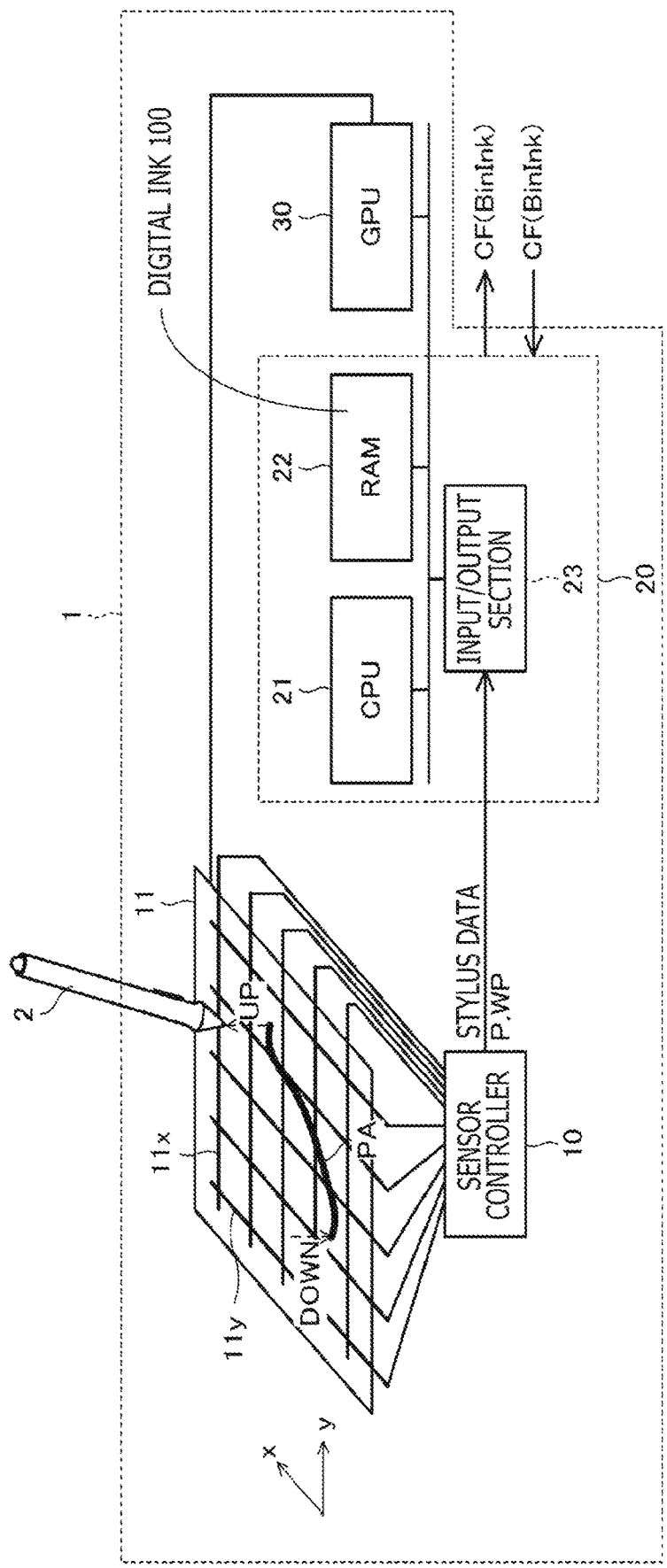
FIG. 1 depicts a system configuration of a coordinate detection device according to an embodiment of the present invention.

FIG. 1 depicts a system configuration of a coordinate detection device 1 according to an embodiment of the present invention. FIG. 1 also depicts a stylus 2 (pointing device) that functions as an input device to input data to the coordinate detection device 1.

As depicted in FIG. 1, the coordinate detection device 1 is a computer configured with a sensor controller 10 connected to an electrode group 11, an input/output section 23 connected to the sensor controller 10, a central processing unit (CPU) 21, a random access memory (RAM) 22, and a graphics processing unit (GPU) 30. Although not depicted, the coordinate detection device 1 is also provided with a display section such as a liquid crystal display. As a specific example, the coordinate detection device 1 is a tablet terminal or a smartphone.

The electrode group 11 is configured with a plurality of electrodes 11x and 11y arranged to form a surface in parallel to a panel surface (flat surface) provided on the coordinate detection device 1. The plurality of electrodes 11x and 11y may be transparent conductors disposed on a display surface of the display section (or a back side thereof). As depicted in FIG. 1, the plurality of electrodes 11x extend in a y direction (direction in a panel surface) and disposed equidistantly in an x direction (direction orthogonal to the y direction in the panel surface). In addition, the plurality of electrodes 11y extend in the x direction and are disposed equidistantly in the y direction.

The sensor controller 10 has a function to detect whether a stylus 2 serving as a pointing device contacts the panel surface ("DOWN" depicted in FIG. 1) or separates from the panel surface ("UP" depicted in FIG. 1) using the electrode group 11, a function to derive position data P that indicates positions of the stylus 2 in the panel surface, and a function to receive a writing pressure value WP from the stylus 2. Here, the position data P may be represented by two-dimensional coordinates indicating each position in the panel surface (that is, a set of x coordinate data and y coordinate data (x,y)), or represented by three-dimensional coordinates indicating the position in the panel surface and a distance between the panel surface and a pen tip of the stylus 2 (that is, a set of x coordinate data, y coordinate data, and z coordinate data (x,y,z)). Furthermore, the writing pressure value WP is a value indicating a force applied to the pen tip of the stylus 2 from the panel surface and may be detected by a sensor provided within the stylus 2.

The sensor controller 10 acquires a series of position data to accompany a motion of the stylus 2 within a predetermined period, which is determined by a state of the stylus 2. For example, in a state in which the position data P is represented by the two-dimensional coordinates, the sensor controller 10 may derive the position data P of the stylus 2 at regular intervals within a period between when the stylus 2 is moved down on the panel surface and when the stylus 2 is removed from the panel surface. As another example, in a state in which the position data P is represented by the three-dimensional coordinates, the sensor controller 10 may derive the position data P of the stylus 2 at regular intervals within a period between when the stylus 2 is first moved down on the panel surface and when a user depresses a button of the stylus 2 (e.g., a push button disposed on a side surface or an end portion of the stylus 2) or within a period between when the user depresses the button of the stylus 2 and when the user again depresses the button of the stylus 2. A series of pieces of position data P derived in this way are respectively associated with writing pressure values WP and are supplied to the input/output section 23 as stylus data.

The CPU 21, the RAM 22, and the input/output section 23 form a digital ink processing section 20 that executes various processes on/for digital ink 100. Specifically, the CPU 21 executes a process of generating the digital ink 100 within the RAM 22 on the basis of the stylus data supplied from the sensor controller 10 to the input/output section 23 and coding the generated digital ink 100 by a coding method depicted in FIG. 8 to be described later. In addition, the CPU 21 executes a process of archiving a binary stream BinInk including the coded digital ink 100 in a container file CF in a predetermined format by a method depicted in FIG. 18 to be described later and outputting the container file CF to outside (of the digital ink processing section 20).

It is noted that an output destination of the container file CF may be another computer or the coordinate detection device 1 itself. Alternatively, the binary stream BinInk in a state of not being archived in the container file CF may be directly output to the outside. In this case, segments obtained by fragmenting the binary stream BinInk may be included in payloads of different packets and the packets may be communicated (transmitted).

Moreover, the CPU 21 may execute a process of receiving an input of a container file CF in which the binary stream BinInk including the coded digital ink 100 is archived (or a binary stream BinInk in a state of not being archived in the container file CF), and decoding the digital ink 100 included in the container file CF by a decoding method depicted in FIGS. 11 and 12 to be described later, thereby restoring the digital ink 100 in the RAM 22.

The GPU 40 has a function to execute rendering of the generated or decoded digital ink 100 in the RAM 22 and to supply a rendering result to the panel surface (display section). Drawing of the digital ink 100 is thereby executed.

The digital ink 100 will be described. The digital ink 100 is data that simulates a handwriting expressed by ink, pencil particles, or the like left on a paper medium or the like using a writing implement such as an ink pen or a pencil. The digital ink 100 includes at least one path data PA. The path data PA is data generated by moving the pointing device such as the stylus 2, and expresses, for example, a geometric shape (features in two-dimensional graphics) of a path (referred to as "trajectory," "path," "stroke," or the like) along which the stylus 2 is moved on the panel surface between when the stylus 2 touches the panel surface ("DOWN" in FIG. 1) and when the stylus 2 separates from the panel surface ("UP" in FIG. 1) after sliding on the panel surface.

While the data that expresses the handwritten path in this way is referred to as "path data" in the present specification, as in Non-Patent Document 1, another term may be used. For example, terms such as "Stroke" used in Non-Patent Document 2 or "Trace" used in Non-Patent Document 3, known as digital ink standards, may also be used as alternatives to the path data.

Various data can be associated with path data PA, such as width data indicating a width of the path, metadata such as color data indicating a color/transparency of the path, and other data (for example, associated image data). Rendering of the path data PA is executed by an associated rendering method. The rendering method may be vector-based rendering of all shapes, or pixel-based rendering which partially uses pixel data such as a bitmap, or a combination of these two methods.

Figure 2:
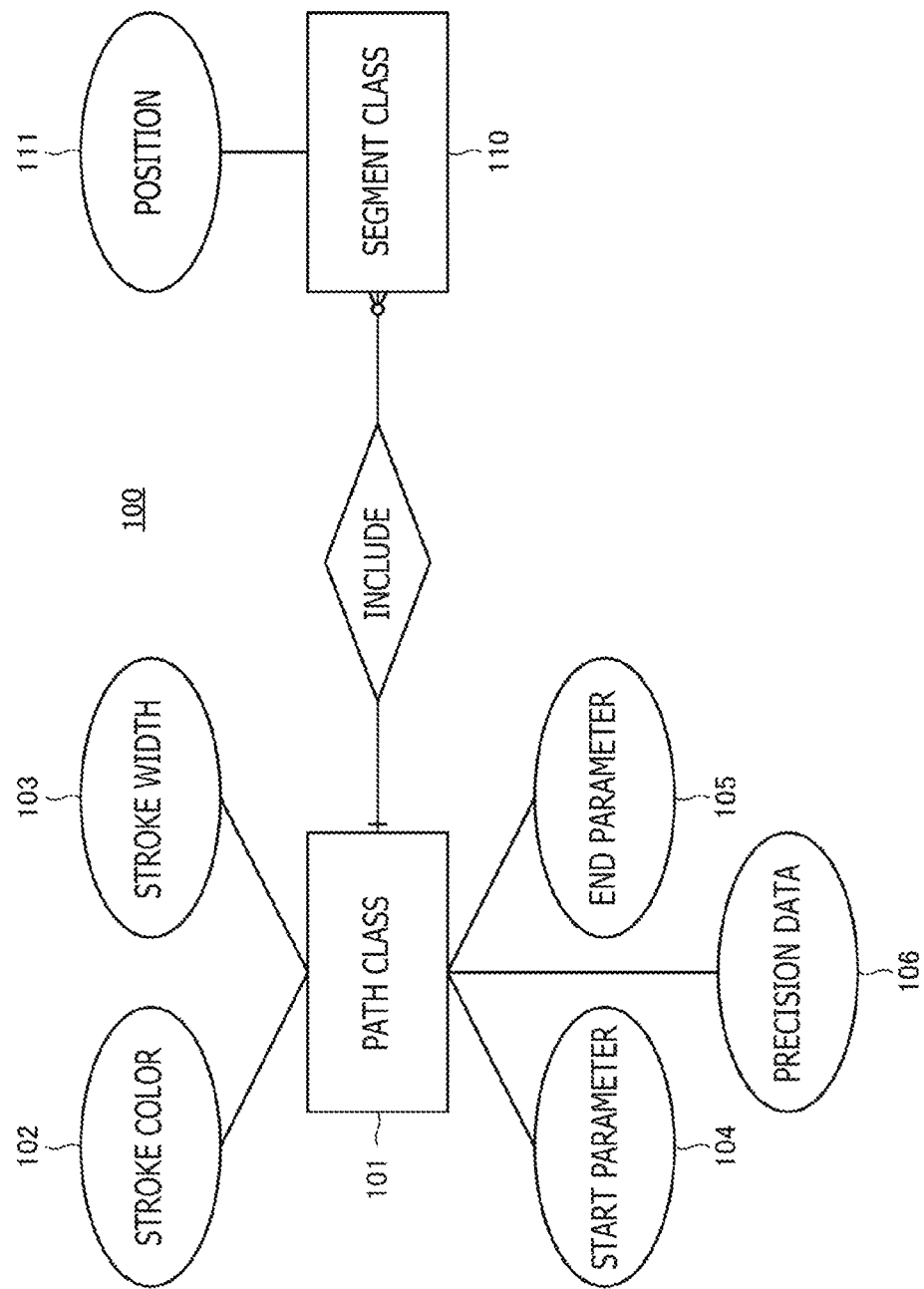
FIG. 2 is an entity-relationship (ER) diagram indicating a data model of digital ink according to an embodiment of the present invention.

FIG. 2 is an entity-relationship (ER) diagram depicting a data model of the digital ink 100. In FIG. 2, a rectangle denotes an entity and an ellipse denotes an attribute of an entity. As depicted in FIG. 2, the digital ink 100 is configured with two entities of a path class 101 and a segment class 110. The path data PA described above is an instance of the path class 101. Furthermore, an instance of the segment class 100 will be referred to as "segment S," hereinafter.

A rhombus in FIG. 2 denotes a relationship between the entities. Signs on two sides of the rhombus each denote a multiplicity (cardinality). In an example of FIG. 2, a relationship (relationship of one-to-zero or more) is shown in which one or more instances (=path data PA) of path class 101 each contains zero or more instances (=segment S) of segment class 110.

The path class 101 is the entity that is a core of the digital ink 100, and used to describe a path of movement ("path stroke" in SVG) of the stylus 2 on the panel surface from when the stylus 2 is moved down on the panel surface until when the stylus 2 is moved up therefrom. The path data PA that is the instance of the path class 101 includes multiple pieces of position data P, and is newly generated whenever one path is generated. Attributes of the path class 101 include two style attributes that are a stroke color 102 and a stroke width 103, two geometric attributes that are a start parameter 104 and an end parameter 105, and precision data 106.

The segment class 110 is the entity that indicates segments into which a path expressed by multiple pieces of position data P forming the path data PA is split, and utilized in association with a predetermined interpolation curve such as a Catmull-Rom spline curve. The following description uses a case in which the interpolation curve is the Catmull-Rom spline curve by way of example. In this case, segments S that are instances of the segment class 110 include four positions 111 as attributes. Each position 111 represents a control point on the interpolation curve and corresponds to any of multiple pieces of position data P forming the path data PA in the case of the Catmull-Rom spline curve. This respect will be described later in detail with reference to FIGS. 6 and 7.

While names of the entities such as the path class 101 and the segment class 110 follow the "Path data," "SVGPathSeg," and the like used in a subset of the SVG specification disclosed in Non-Patent Document 1, the attributes depicted in FIG. 2 are extensions for the digital ink 100 of the present disclosure.

Figure 3:
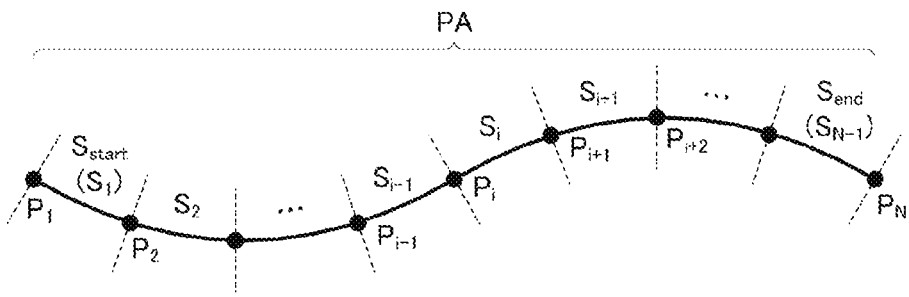
FIG. 3 depicts a geometric relationship between path data configured with N pieces of position data and (N−1) segments contained in this path data.

FIG. 3 depicts a geometric relationship between the path data PA configured with N pieces of position data $P_1$ to $P_N$ and (N−1) segments $S_1$ to $S_{N-1}$ contained in this path data PA. As depicted in FIG. 3, segment $S_k$ (where k is an integer from 1 to N−1) is data that represents a curve formed between position data $P_k$ and position data $P_{k+1}$.

With reference back to FIG. 2, the stroke color 102 is the attribute that indicates a color and a transparency used at a time of rendering the path data PA. The color and the transparency indicated by the stroke color 102 may be one color and one transparency (one RGB value, and one transparency value A: "fixed color") per path data PA, or may be M colors and M transparencies (M RGB values and M transparency values A: "variable colors") per path data PA. Furthermore, the stroke color 102 indicating one RGB value and M transparency values A may correspond to one path data PA. It is noted that M is an integer equal to or greater than 1 and equal to or smaller than N. While the stroke color 102 is not specifically described below, the digital ink processing section 20 is configured to code and decode the stroke color 102 by a process similar to a process performed on the stroke width 103 to be described later.

The stroke width 103 is the attribute indicating a width of the path at positions indicated by the plurality of position data forming the path data PA. The digital ink processing section 20 determines a specific value of the stroke width 103 (width data W) on the basis of the writing pressure value WP (refer to FIG. 1) supplied from the sensor controller 10. Similarly to the stroke color 102, the width indicated by the stroke width 103 may be one width (fixed width) per path data PA or may be M widths (variable widths) per path data PA. It is noted that a specific value of M may be either the same or different between the stroke color 102 and the stroke width 103.

Figure 4A:
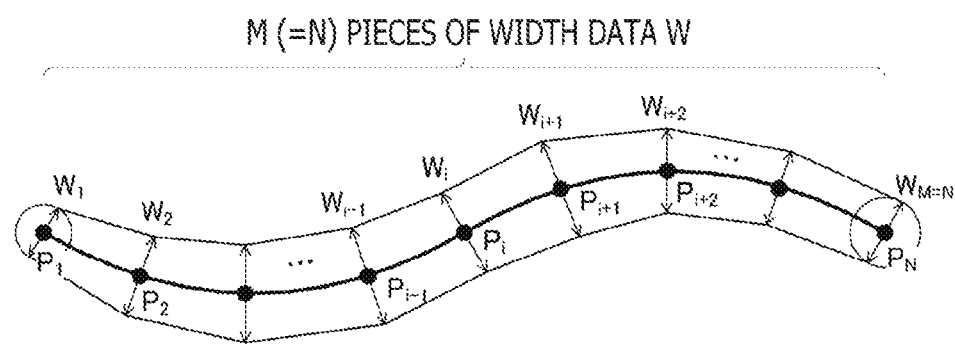
FIGS. 4A and 4B depict examples of width data included in the path data depicted in FIG. 3.
Figure 4B:
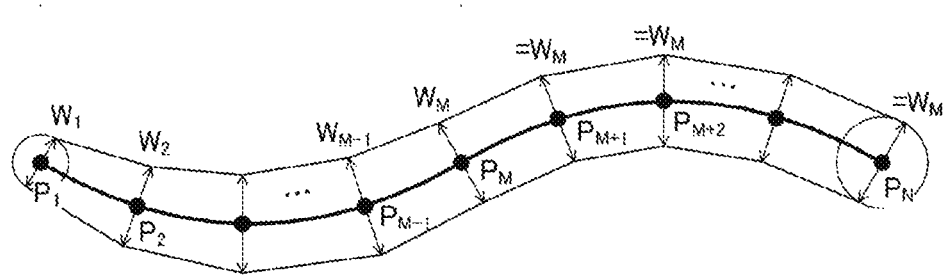

FIGS. 4A and 4B depict examples of the width data W included in the path data PA depicted in FIG. 3. FIGS. 4A and 4B depict examples in which N pieces of position data $P_1$ to $P_N$ forming the path data PA are each represented by two-dimensional coordinates. FIG. 4A indicates a case of M=N and FIG. 4B indicates a case of M<N.

With reference first to FIG. 4A, the path data PA in this case includes N pieces of width data $W_1$ to $W_N$ indicating widths of the path at the positions indicated by the N pieces of position data $P_1$ to $P_N$, respectively. In the rendering using the GPU 40 depicted in FIG. 1, the widths of the path at the positions indicated by N pieces of position data $P_1$ to $P_N$ are determined in accordance with N pieces of width data $W_1$ to $W_N$, respectively, and circles having the determined widths as diameters are smoothly enveloped, thereby executing drawing of the path. Patent Document 2 mentioned above describes details of such drawing.

It is noted that an ellipse, instead of a circle, may be used as graphics used to draw the path. In this case, each width data W is data indicating a major axis, a minor axis, or the like of the ellipse, and the GPU 40 needs to determine a direction of the ellipse at each position at a time of determining the width of the path at each of the positions indicated by N pieces of position data $P_1$ to $P_N$. This is because a drawing result varies depending on the direction of the ellipse at each position. On the other hand, in a case of using the circle, this step of determining a direction can be omitted since the circle exhibits isotropy.

With reference next to FIG. 4B, the path data PA in this case includes M pieces of width data $W_1$ to $W_M$ indicating the widths of the path at the positions indicated by M pieces of position data $P_1$ to $P_M$, respectively. It is noted, however, that M<N in FIG. 4B. The path data PA does not include width data W indicating widths of the path at positions indicated by (N−M) pieces of position data $P_{M+1}$ to $P_N$, respectively.

In this case, in the rendering by the GPU 40 depicted in FIG. 1, the widths of the path at the positions indicated by M pieces of position data $P_1$ to $P_M$ are determined first in accordance with M pieces of width data $W_1$ to $W_M$, respectively. Next, the widths of the path at the positions indicated by remaining (N−M) pieces of position data $P_{M+1}$ to $P_N$ are determined in accordance with any of the M pieces of width data $W_1$ to $W_M$ (in accordance with the width data $W_M$ in the example of FIG. 4B). The drawing of the path is then executed by smoothly enveloping circles having the determined widths as diameters.

As can be understood from the description for FIG. 4B, in a case of M=1, the widths of the path at the positions indicated by N pieces of position data $P_1$ to $P_N$ are determined in accordance with one width data $W_1$ in the rendering by the GPU 40 depicted in FIG. 1. In this case, the drawing of the path is executed as having a fixed width.

Figure 5:
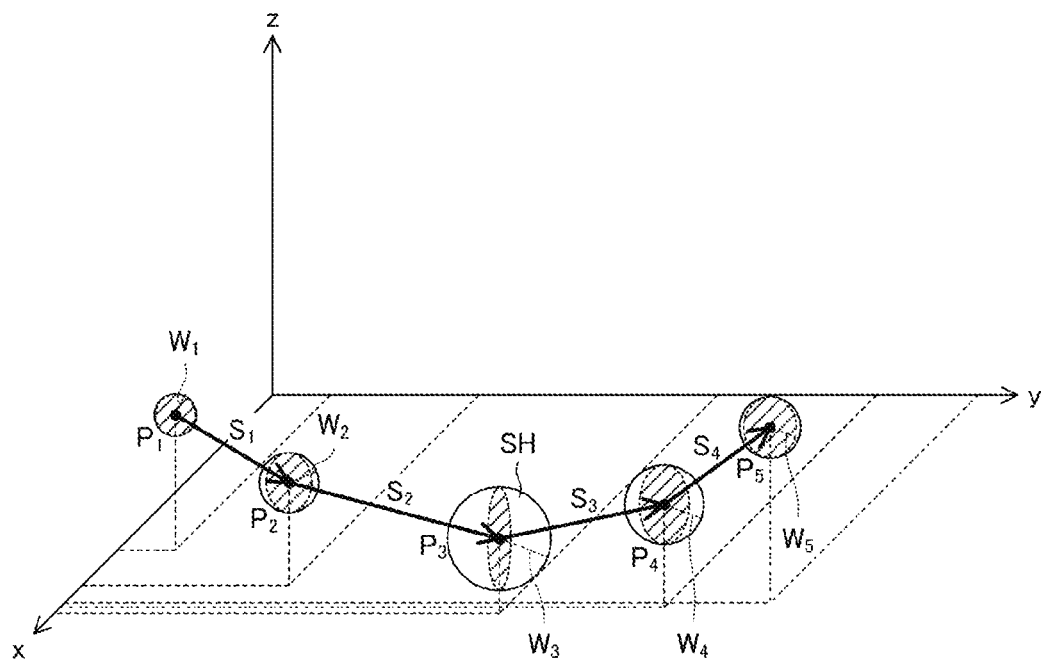
FIG. 5 depicts another example of the width data included in the path data depicted in FIG. 3.

FIG. 5 depicts another example of the width data W included in the path data PA depicted in FIG. 3. FIG. 5 depicts an example in which N pieces of position data $P_1$ to $P_N$ forming the path data PA are each represented by three-dimensional coordinates. N=5 in FIG. 5.

As depicted in FIG. 5, in a case in which the position data $P_1$ to $P_N$ is each represented by three-dimensional coordinates including z coordinate data, it is suitable to assume that the width data W is data indicating, for example, a diameter or a radius of a sphere SH. In the rendering in this case, the diameters of the spheres SH centered at the positions indicated by N pieces of position data $P_1$ to $P_N$ are determined by N pieces of width data $W_1$ to $W_N$, respectively. Furthermore, great circles (graphics shaded in FIG. 5) of the spheres SH located in a plane that is perpendicular to the travelling direction of the position data P (for example, an extending direction of a tangent at each position of an interpolation curve formed by interpolating the position data $P_1$ to $P_N$) are determined. The drawing of the path is then executed such that the path smoothly passes through each great circle.

The width data W in the case in which the position data P is represented by the three-dimensional coordinates may be data corresponding to a contour or an area of a predetermined shape through which the path passes. The width data W indicating the diameter of each sphere SH described above is an example of such width data W. Furthermore, the predetermined shape is not necessarily the great circle of the sphere SH but may be an ellipse or a square. In this case, however, the GPU 40 needs to determine a direction of the ellipse or the square in the perpendicular plane for obtaining coordinate positions of the predetermined shape placed in the plane perpendicular to the travelling direction at the time of drawing the path. In a case of using the great circle, the coordinate positions of the contour are determined by one parameter since the great circle exhibits isotropy in the perpendicular plane; thus, it is possible to omit the step of determining the direction.

With reference back to FIG. 2, the start parameter 104 is the attribute indicating a drawing start position of a start segment $S_{start}$ corresponding to the start of one or more segments S forming one path data PA. The end parameter 105 is the attribute indicating a drawing end position of an end segment $S_{end}$ corresponding to the tail end of the one or more segments S forming the one path data PA.

Figure 6:
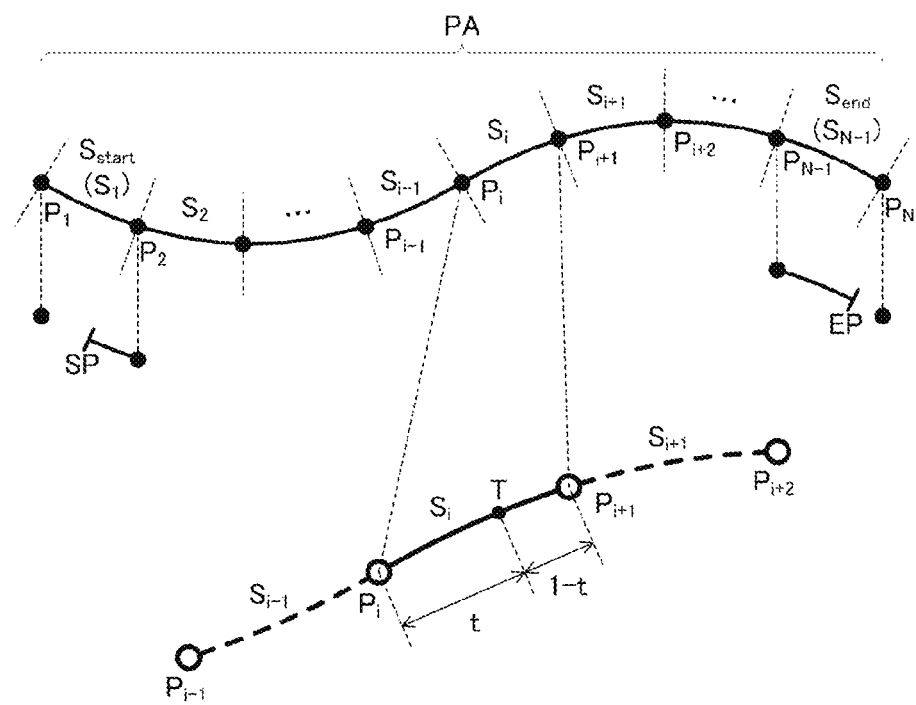
FIG. 6 is an explanatory diagram of a start parameter and an end parameter depicted in FIG. 2.

FIG. 6 is an explanatory diagram of the start parameter 104 and the end parameter 105. The path data PA and each segment S depicted in FIG. 6 are the same as those depicted in FIGS. 3, 4A, and 4B. The Catmull-Rom spline curve will be also described in detail with reference to FIG. 6.

The start parameter 104 is represented by a t value of a start segment $S_{start}$ (=$S_1$). The t value indicates an internally dividing point of a segment, and takes on a value equal to or greater than 0 and equal to or smaller than 1, as indicated in an enlarged view of a segment $S_i$ additionally depicted in FIG. 6. According to the start parameter 104, an arbitrary position between a position indicated by position data $P_1$ and a position indicated by position data $P_2$ can be designated as a position of starting a display process.

An initial value of the start parameter 104 is 0 (refer to "default=0" in line 2 of FIG. 10 to be described later). This initial value 0 indicates that the rendering of the path data PA starts at the start (top) of the start segment $S_{start}$. For reference, FIG. 6 depicts a position SP at which display of the start segment $S_{start}$ starts in a case in which a value of the start parameter 104 is 0.5.

The end parameter 105 is represented by a t value of an end segment $S_{end}$ (=$S_{N-1}$). According to the end parameter 105, an arbitrary position between the position indicated by the position data $P_{N-1}$ and a position indicated by the position data $P_N$ can be designated as a position of ending the display process.

An initial value of the end parameter 105 is 1 (refer to "default=1" in line 3 of FIG. 10 to be described later). This initial value 1 indicates that the rendering of the path data PA is executed up to a tail end of the end segment $S_{end}$. For reference, FIG. 6 depicts a position EP at which display of the end segment $S_{end}$ ends in a case in which a value of the end parameter 105 is 0.7.

In the segment $S_i$ that is neither the start segment $S_{start}$ nor the end segment $S_{end}$, the t value does not have a significant meaning since the display process is executed in all sections within the segment $S_i$. One start parameter 104 and one end parameter 105 are present per path data PA.

The Catmull-Rom spline curve will be described. The segment $S_i$ by the Catmull-Rom spline curve includes, as the positions 111 (refer to FIG. 2) that are the attributes, two position data $P_i$ and $P_{i+1}$ located at both ends of the segment $S_i$ and also includes two position data $P_{i+1}$ and $P_{i+2}$ located outside of the position data $P_i$ and $P_{i+1}$. The GPU 40 depicted in FIG. 1 is configured to determine a specific shape of the segment $S_i$ by using coordinates of these four pieces of position data $P_{i-1}$ to $P_{i+2}$ as control points of the Catmull-Rom spline curve.

Figure 7:
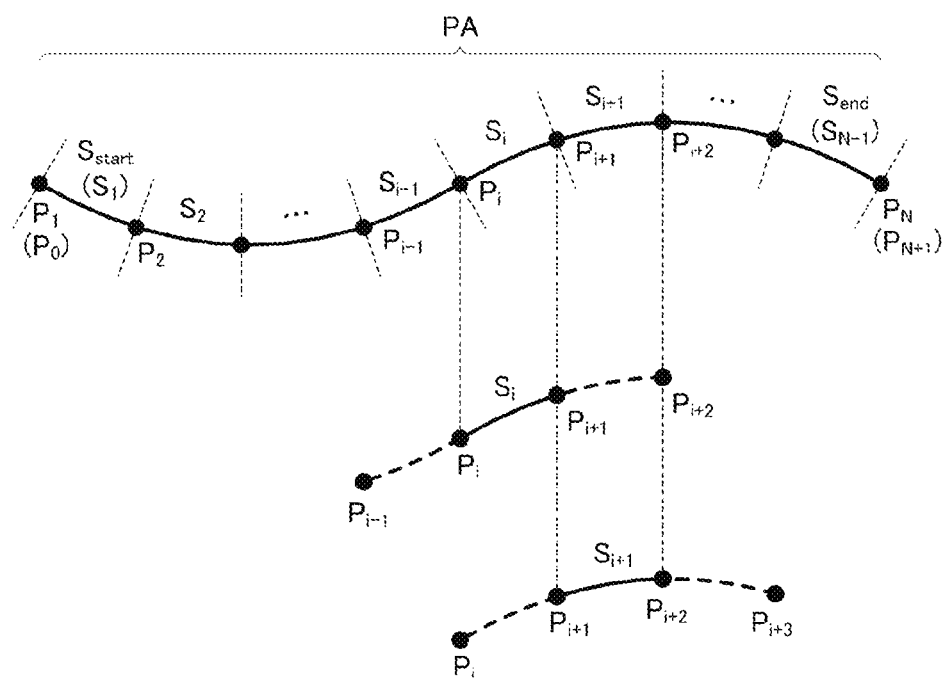
FIG. 7 depicts a relationship between each of the segments depicted in FIG. 6 and a Catmull-Rom spline curve drawn by a graphics processing unit (GPU)

FIG. 7 depicts a relationship between each of the segments $S_i$ and $S_{i+1}$ depicted in FIG. 6 and the Catmull-Rom spline curve drawn by the GPU 40. In a middle part of FIG. 7, it is indicated that a set of four pieces of position data $\{P_{i-1}, P_i, P_{i+1}, P_{i+2}\}$ defines the specific shape of the segment $S_i$ present between the positions indicated by the position data $P_i$ and $P_{i+1}$, respectively. In addition, in a lower part of FIG. 7, it is indicated that a set of four pieces of position data $\{P_i, P_{i+1}, P_{i+2}, P_{i+3}\}$ obtained by sliding by one the set of four pieces of position data $\{P_{i-1}, P_i, P_{i+1}, P_{i+2}\}$ defines the specific shape of the segment $S_{i+1}$ present between the positions indicated by the position data $P_{i+1}$ and $P_{i+2}$, respectively.

In the example of FIG. 7, a shape of a curve forming the start segment $S_{start}$ is defined by a set of four pieces of position data $\{P_0, P_1, P_2, P_3\}$, wherein position data $P_0$ is set at the same position as position data $P_1$ corresponding to a start point of the path data PA. Likewise, a shape of a curve forming the end segment $S_{end}$ is defined by a set of four pieces of position data $\{P_{N-2}, P_{N-1}, P_N, P_{N+1}\}$, wherein position data $_PN+1$ is set at the same position as position data $_PN$ corresponding to an end point of the path data PA. It is noted, however, a value indicating a position different from that indicated by position data $P_1$ may be set for position data $P_0$, and a value indicating a position different from that indicated by position data $P_N$ may be set for position data $P_{N+1}$.

Figures 9, 10:
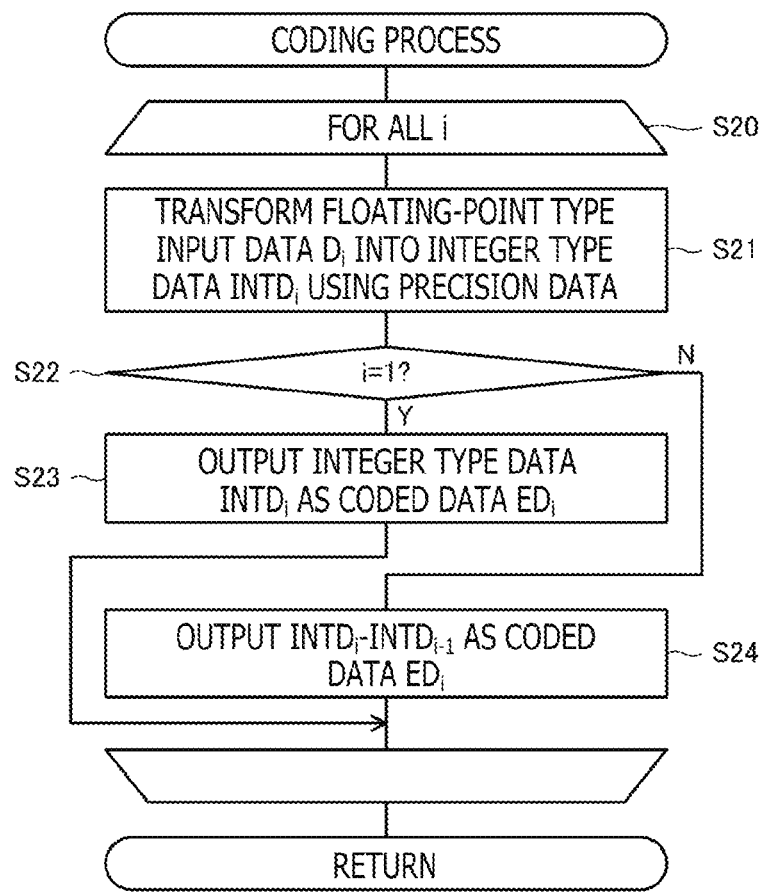
FIG. 9 is a flowchart of a coding process on position data P and width data W according to an embodiment of the present invention.
FIG. 10 depicts an example of a schema of a path message obtained by coding one path data.

With reference back to FIG. 2, the precision data 106 is an attribute indicating coding precision used at the time of coding the path data PA, and the precision data 106 of a higher value indicates that precision of integer type data, obtained as a result of a conversion process (Step S21) to be described later with reference to FIG. 9, is finer (higher). One precision data 106 is allocated to one path data PA. A reason for allocating one precision data 106 to one path data PA is because acquisition precision of the position data P or the width data W may vary depending on a type of the stylus 2 or a type of the coordinate detection device 1 used at the time of generating the path data PA.

The coding and decoding processes on the digital ink 100 executed by the digital ink processing section 20 depicted in FIG. 1 will be described below in detail with reference to FIGS. 8 to 13.

Figure 8:
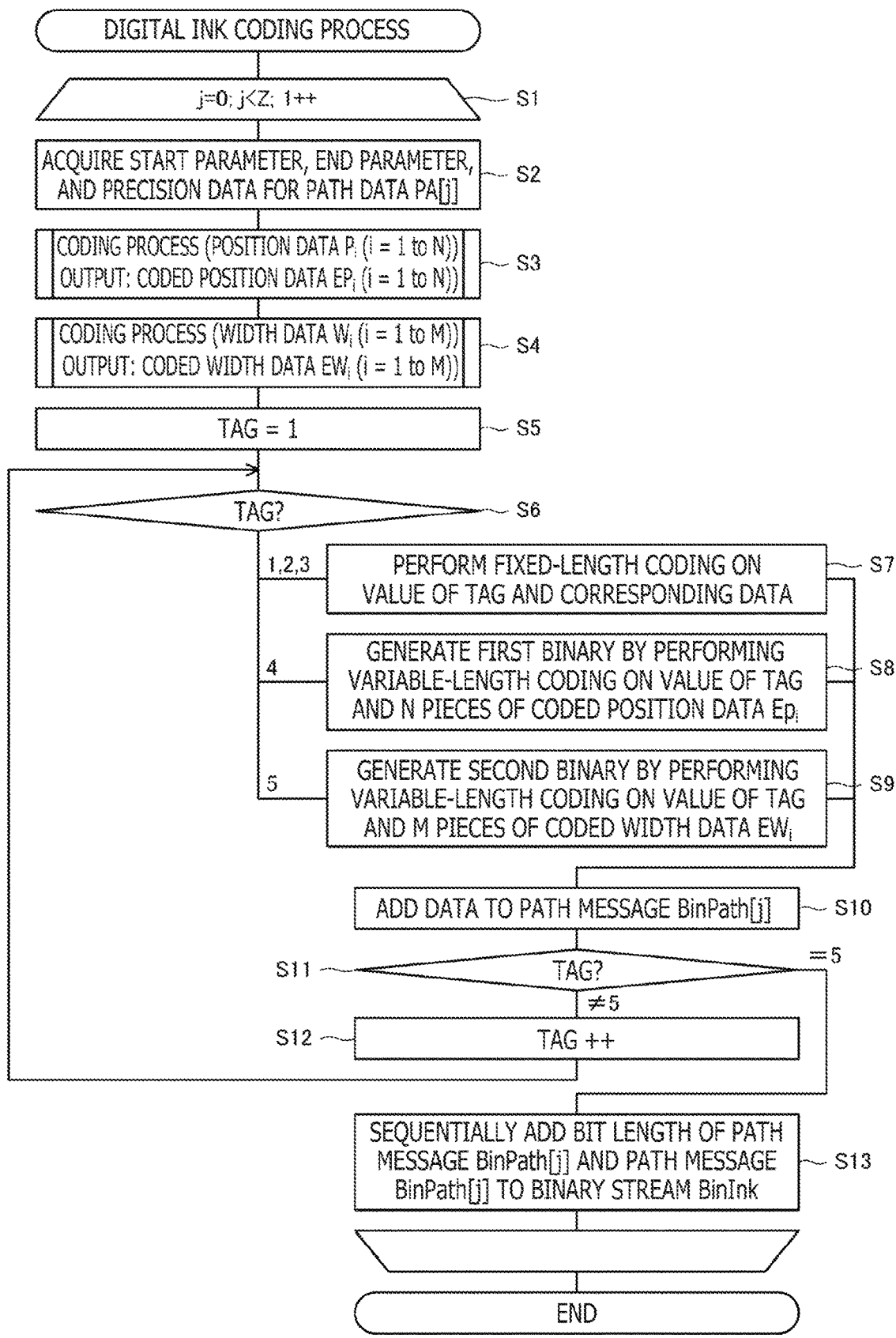
FIG. 8 is a flowchart depicting a coding process on the digital ink according to an embodiment of the present invention.

FIG. 8 is a flowchart depicting the coding process on the digital ink 100. As depicted in FIG. 8, the digital ink processing section 20 is configured to repeat Steps S2 to S12 by the number of path data PA (j=1~Z) included in the digital ink 100 (Step S1). The pieces of path data PA are sequentially coded by this repetition. Each of the coded path data PA configures a path message BinPath and each path message BinPath is sequentially added into one binary stream BinInk in a distinguishable (separable) state, as described later in detail. It is assumed in FIG. 8 and subsequent drawings that j-th path data PA is represented by "path data PA[j]."

As for the j-th path data PAR the digital ink processing section 20 acquires first the start parameter 104, the end parameter 105, and the precision data 106 depicted in FIG. 2 (Step S2). The digital ink processing section 20 typically acquires initial values 0 and 1, respectively, as the start parameter 104 and the end parameter 105. However, in a case in which the path data PA[j] is generated as a result of cutting (splitting) another path data PA by a user operation or the like, the start parameter 104 or the end parameter 105 often takes on a value other than the initial value. The digital ink processing section 20 acquires, as a value of the precision data 106, a value preset to correspond to a combination of the stylus 2 and the coordinate detection device 1 used for generating the path data PA[j].

Next, the digital ink coding processing section 20 acquires N pieces of coded position data $EP_1$ to $EP_N$ by executing a coding process on N pieces of position data $P_1$ to $P_N$ included in the path data PA[j] (Step S3).

FIG. 9 is a flowchart of a coding process on the position data P. As described later, this coding process may also be used for coding the width data W. As depicted in FIG. 9, the coding process is repeatedly executed for one or more pieces of input data $D_i$ ($i \geq 1$) (Step S20). In a case in which this coding process is called in Step S3 of FIG. 8, the one or more input data $D_i$ is processed into N pieces of position data $P_1$ to $P_N$.

As for i-th input data $D_i$, the digital ink processing section 20 performs first a process of converting floating-point type input data $D_i$ into integer type data $INTD_i$ using the precision data 106 acquired in Step S2 of FIG. 8 (Step S21). Performing this process makes it possible to not only reduce the number of bits of the input data $D_i$ but also reduce the number of bits of binary data generated as a result of variable-length coding performed in Steps S8 and S9 of FIG. 8 to be described later.

Next, the digital ink processing section 20 derives coded data ED, obtained by coding the input data $D_i$. Specifically, the digital ink processing section 20 determines whether or not i is equal to 1 (Step S22), and outputs the integer type data $INTD_i$ as the coded data ED, in a case of determining that i is equal to 1 (Step S23). On the other hand, in a case of determining that i is not equal to 1, the digital ink processing section 20 outputs a value $INTD_i - INT_{Di-1}$ (differential value) obtained by subtracting previous integer type data $INTD_{i-1}$ from the integer type data $INTD_i$ as the coded data $ED_i$ (Step S24). In Step S3, the coded data $ED_i$ output in this way is acquired as coded position data $EP_i$.

Reference is made back to FIG. 8. Subsequently, the digital ink processing section 20 executes the coding process depicted in FIG. 9 with M pieces of width data $W_i$ to $W_M$ included in the path data PA[j] as one or more input data $D_1$, thereby acquiring M pieces coded width data $EW_i$ to $EW_M$ (Step S4). A detailed content of the coding process is the same as described with reference to FIG. 9.

A process in Steps S5 to S12 executed subsequently is a process of coding each data configuring the path data PA[j] in accordance with a predetermined schema, thereby generating a path message BinPath[j] to be added to the binary stream BinInk.

FIG. 10 depicts an example of a schema of the path message BinPath (data structure of the digital ink 100) obtained by coding one path data PA. This schema is used not only for generating the path message BinPath by the coding process depicted in FIG. 8 but also for decoding each data configuring the path data PA in the decoding process depicted in FIGS. 11 and 12 to be described later. In FIG. 10, an interface definition language is used for describing the schema.

As depicted in FIG. 10, in the schema of the path message BinPath according to the present embodiment, a field (StartParameter) is defined for the start parameter 104 in a second row, a field (endParameter) is defined for the end parameter 105 in a third row, a field (decimalPrecision; the third binary data) is defined for the precision data 106 in a fourth row, a field (Positions; the first binary data) is defined for the position data P in a fifth row, a field (strokeWidths; the second binary data) is defined for the width data W in a sixth row, and a field (strokeColor) is defined for the color data in a seventh row. It is noted that the color data is a specific value of the stroke color 102. The fields are stored in mutually different regions in the path message BinPath. For example, the field for the width data W as a whole is separated from the field of the position data P indicating each of a series of sets of x coordinate data, y coordinate data, and z coordinate data (where the z coordinate data is present only in the case of the three-dimensional coordinates).

A phrase "optional" added to a name of a field indicates that the field is optional. A phrase "repeated" indicates that the field can take on a plurality of values. Furthermore, "float" indicates a floating-point type, "uint32" indicates an unsigned 32-bit integer type, and "sint32" indicates a signed 32-bit integer type. A numeric value described immediately behind an equal sign in each field indicates a value of a tag for identifying the field, and a value indicated by "default" indicates an initial value of the field. Further, "packed=true" indicates that data stored in each field is compressed. "Compressed" herein means data having been subjected to the coding process depicted in FIG. 9.

With reference back to FIG. 8, the digital ink processing section 20 sets 1 to the value of the tag in Step S5. The digital ink processing section 20 then determines the value of the tag (Step S6). In a case in which the value of the tag is any one of 1, 2, and 3, the digital ink processing section 20 performs a fixed-length coding process on the value of the tag and corresponding data (Step S7).

Objects to be coded in Step S7 include the start parameter 104, the end parameter 105, and the precision data 106 acquired in Step S2. In a case in which the value of the tag is 1, the digital ink processing section 20 generates floating-point type data by performing fixed-length coding on the start parameter 104 and adds the floating-point type data to the path message BinPath[j] (Step S10). Furthermore, in a case in which the value of the tag is 2, the digital ink processing section 20 generates floating-point type data by performing fixed-length coding on the end parameter 105 and adds the floating-point type data to the path message BinPath[j] (Step S10). Moreover, in a case in which the value of the tag is 3, the digital ink processing section 20 generates unsigned 32-bit integer type data (the third binary data) by performing fixed-length coding on the precision data 106 (a precision data coding step), and adds the data to the path message BinPath[j] (Step S10).

Here, a reason for allocating a lower tag value (3 in the example of FIG. 10) to the precision data 106 than the position data P, the width data W, and the color data is to enable the precision data 106 to be decoded prior to these pieces of data in the decoding process depicted in FIGS. 11 and 12 to be described later. Decoding the precision data 106 prior to the other data makes it possible to correctly decode the position data P, the width data W, and the color data.

The digital ink processing section 20 having added each data to the path message BinPath[j] in Step S10 determines whether or not the value of the current tag is 5 (Step S11), increments the value of the tag by 1 (Step S12) in a case in which the value of the current tag is not 5, and returns the process to Step S6. In a case of considering coding of the color data, determination in Step S11 becomes determination as to whether or not the value of the tag is 6. The process in a case in which the value of the tag is determined to be 5 will be described later.

In a case of determining in Step S6 that the value of the tag is 4, the digital ink processing section 20 generates the first binary data indicating a series of sets of x coordinate data, y coordinate data, and z coordinate data (where z coordinate data is present only in the case of the three-dimensional coordinates) by performing variable-length coding on value 4 of the tag and N pieces of coded position data $EP_1$ to $EP_N$ acquired in Step S3 (Step S8; a coordinate coding step), and adds the generated first binary data to the path message BinPath[j] (Step S10). Any suitable scheme of the variable-length coding may be used as long as the number of bits of a value obtained as a result of coding becomes smaller as an absolute value of a value to be coded becomes smaller. For example, sint32 or the like used in an exponential-Golomb code and Google Protocol buffers may be used.

Here, the values of the position data P acquired by motion of the stylus 2 tend to be two consecutive values close to each other. This is because the stylus 2 physically exists as one unit and is moved to follow the panel surface. Therefore, as described with reference to FIG. 9, by coding the differential value between the two consecutive pieces of position data P and using the variable-length coding to code the differential value, it becomes possible to encode a value having a relatively high occurrence probability into a code having a small number of bits to thereby reduce the number of bits of the digital ink 100.

In a case of determining in Step S6 that the value of the tag is 5, the digital ink processing section 20 generates the second binary data which as a whole is separated from the first binary data by performing variable-length coding on value 5 of the tag and M pieces of coded width data $EW_1$ to $EW_M$ acquired in Step S4 (Step S9; a width coding step), and adds the generated second binary data to the path message BinPath[j] (Step S10). Similarly to Step S8, any suitable scheme of the variable-length coding may be used as long as the number of bits of a value obtained as a result of coding becomes smaller as an absolute value of a value to be coded becomes smaller. For example, sint32 or the like used in the exponential-Golomb code and Google Protocol buffers may be used.

Here, the values of the width data W tend to be two consecutive values close to each other, similarly to the case of the position data P. This is because the width data W is determined from the writing pressure value WP as described above and the writing pressure value WP is a value obtained by sampling a force applied to physically push the stylus 2. In this case, therefore, by coding the differential value between the two consecutive pieces of width data W and using the variable-length coding to code the differential value, it becomes possible to encode a value having a relatively high occurrence probability into a code having a small number of bits to thereby reduce the number of bits of the digital ink 100.

When Step S10 ends after Step S9, the data related to the path data PA that is being processed is all serialized in the path message BinPath[j]. In a case of considering color data coding, the data related to the path data PA that is being processed is all serialized in the path message BinPath[j] after a process on the color data ends.

The path message BinPath[j] generated in this way is binary data including the first binary data (the position data P), the second binary data (the width data W), and the third binary data (the precision data 106) in mutually different regions such that the third binary data is ahead of the second binary data in the decoding order. In a case of determining in Step S11 that the value of the tag is 5 (6 in the case of considering coding the color data), the digital ink processing section 20 determines that the path message BinPath[j] is completed, and performs a process of sequentially adding a bit length of the path message BinPath[j] and the path message BinPath[j] itself to the binary stream BinInk (Step S13; a serialization step).

The digital ink processing section 20 executes the above-described processes for each of Z pieces of path data PA in the digital ink 100, thereby completing the binary stream BinInk obtained by serializing the path message BinPath of each path data PA.

Table 1 depicts a configuration of the binary stream BinInk generated as a result of the processes described above. As depicted in this Table 1, the binary stream BinInk is configured to repeatedly include a combination of the bit length of the path message BinPath and the path message BinPath itself, for as many times as the number of a plurality of path data PA. It is noted that the path message BinPath includes pairs {value of tag, binary data} depicted in the schema of FIG. 10.

TABLE 1

| Explanation | byte/sequence |
| --- | --- |
| 128 bit varint | Bit length of path message BinPath[0] of first path data PA[0] |
| Bytes | Path message BinPath[0] of first path data PA[0] |
| 128 bit varint | Bit length of path message BinPath[1] of second path data PA[1] |
| Bytes | Path message BinPath[1] of second path data PA[1] |
| ... | ... |
| 128 bit varint | Bit length of path message BinPath[Z-1] of Z-th path data PA[Z-1] |
| Bytes | Path message BinPath[Z-1] of Z-th path data PA[Z-1] |

Figure 11:
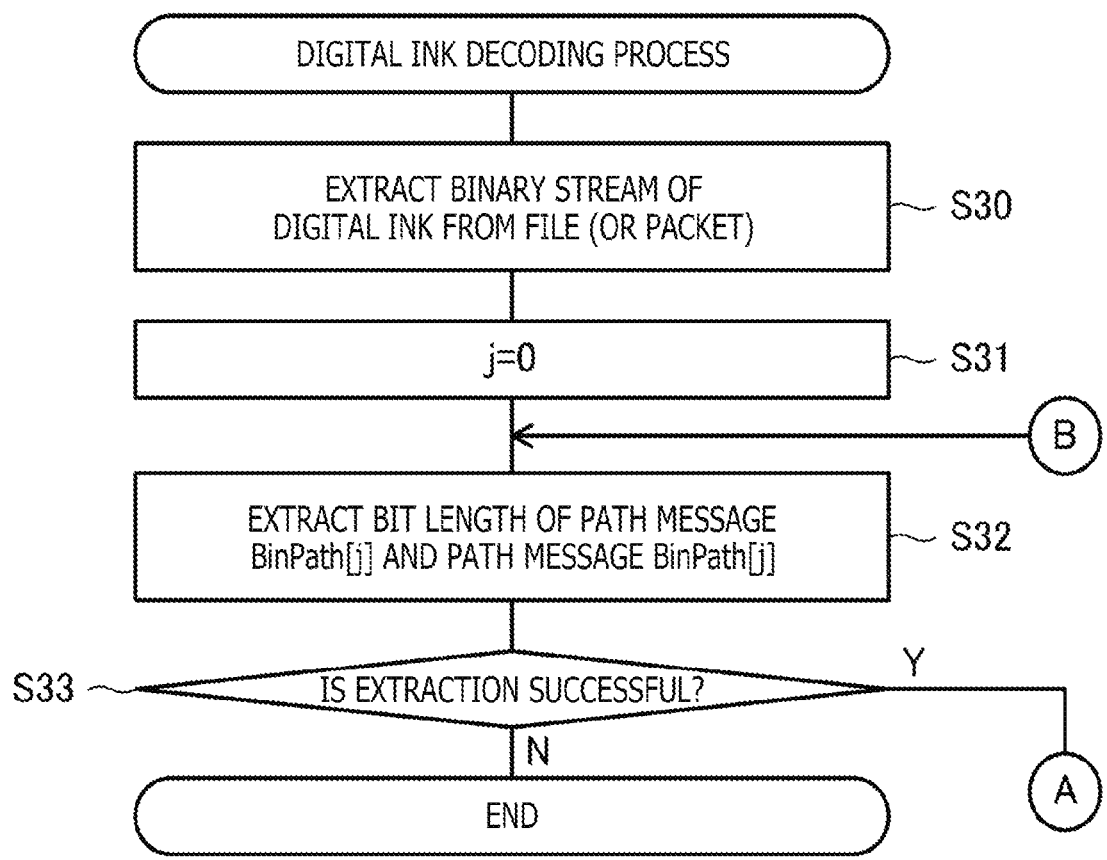
FIGS. 11 and 12 are flowcharts depicting a decoding process on the digital ink according to an embodiment of the present invention.
Figure 12:
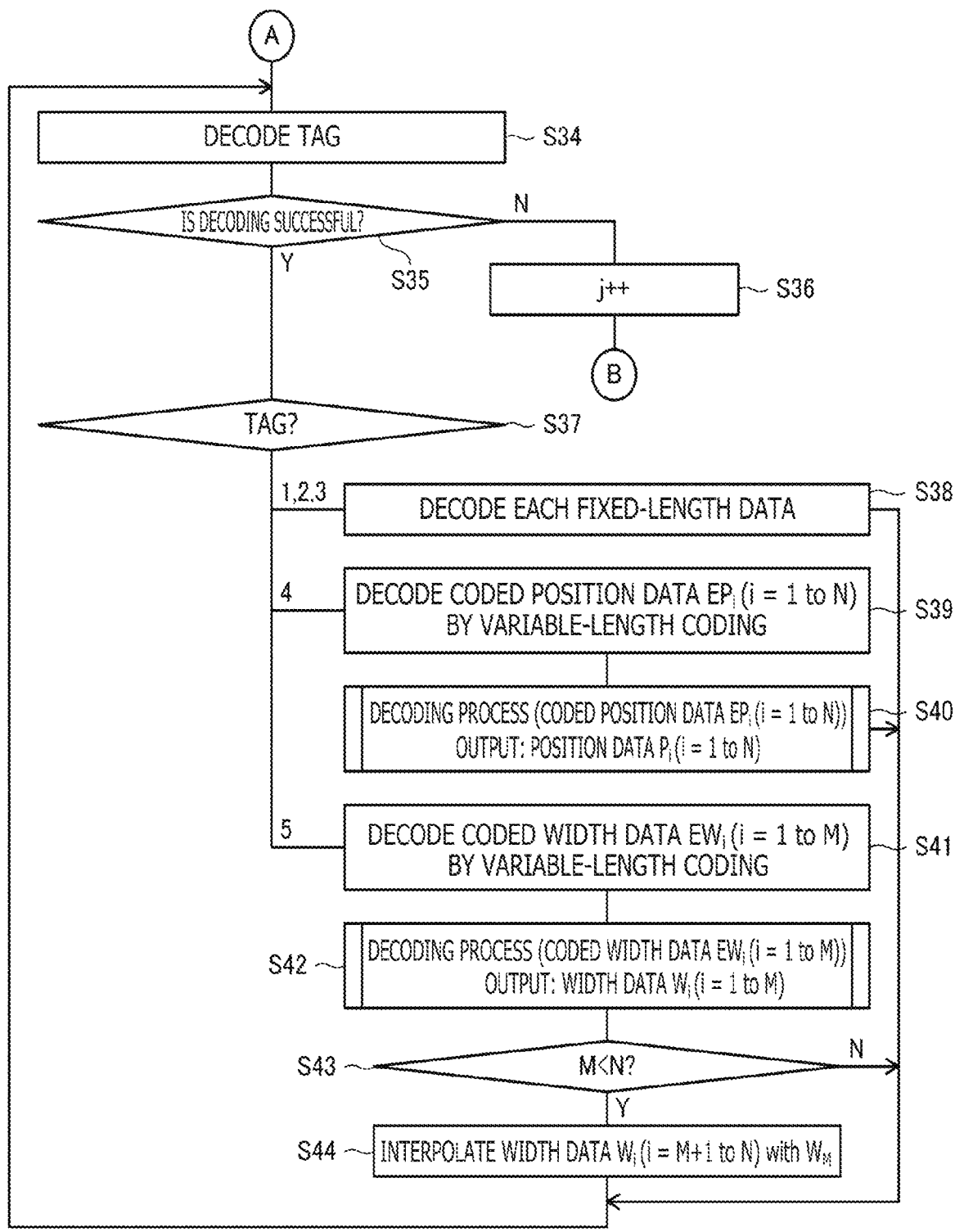

Next, FIGS. 11 and 12 are flowcharts depicting the decoding process on the digital ink 100. As depicted in FIGS. 11 and 12, the digital ink processing section 20 performs first a process of extracting the binary stream BinInk including the digital ink 100 from a container file CF including the binary stream BinInk or from a communication packet in which the binary stream BinInk is fragmented (Step S30).

Next, the digital ink processing section 20 substitutes 0 into a variable j (Step S31), and tries extracting the bit length of the path message BinPath[j] and the path message BinPath[j] from the binary stream BinInk extracted in Step S30 (Step S32). As a result, the process goes to Step S34 of FIG. 12 if extraction is successful, or the process ends if extraction is not successful.

The process in and after Step S34 is a process of decoding each data (the start parameter 104, the end parameter 105, the precision data 106, the position data P, the width data W, and the color data) stored in the path message BinPath[j] in accordance with the schema depicted in FIG. 10.

Specifically, the digital ink processing section 20 tries first decoding a tag included at the beginning of a portion to be decoded in the path message BinPath (Step S34). The digital ink processing section 20 then determines whether or not decoding is successful (Step S35). If decoding is not successful, the digital ink processing section 20 increments a value of variable j by 1 (Step S36) and returns the process to Step S32 of FIG. 11. A process is thereby started for the next path message BinPath[j].

On the other hand, if decoding is successful in Step S35, the digital ink processing section 20 determines the value of the decoded tag (Step S37). As a result, in a case in which the value of the tag is any one of 1, 2, and 3, the digital ink processing section 20 performs a process of decoding respective binary data of a fixed length stored in a region after the respective tag to obtain respective data of a fixed length (Step S38). The data decoded in this way is the start parameter 104 in a case in which the value of the tag is 1, the end parameter 105 in a case in which the value of the tag is 2, and the precision data 106 in a case in which the value of the tag is 3. Each time Step S38 is completed for a certain tag value (1, or 2, or 3), the digital ink processing section 20 returns the process to Step S34 and executes decoding of the value of the next tag.

Next, in a case of determining in Step S37 that the value of the tag is 4, the digital ink processing section 20 performs a process of decoding N pieces of position data $P_1$ to $P_N$ from the binary data stored in a region after the tag having value 4 (the first region) (Steps S39 and S40; a position data decoding step).

Specifically, in Step S39, the digital ink processing section 20 first performs variable-length decoding of the coded binary data (the first binary data) to obtain N integer type coded values. This process is an inverse process of the process in Step S8 depicted in FIG. 8, and N pieces of coded position data $EP_1$ to $EP_N$ are acquired as a result of this process.

Next, in Step S40, the digital ink processing section 20 performs a decoding process of restoring N pieces of floating-point type position data $P_1$ to $P_N$ from N pieces of coded position data $EP_1$ to $EP_N$.

Figure 13:
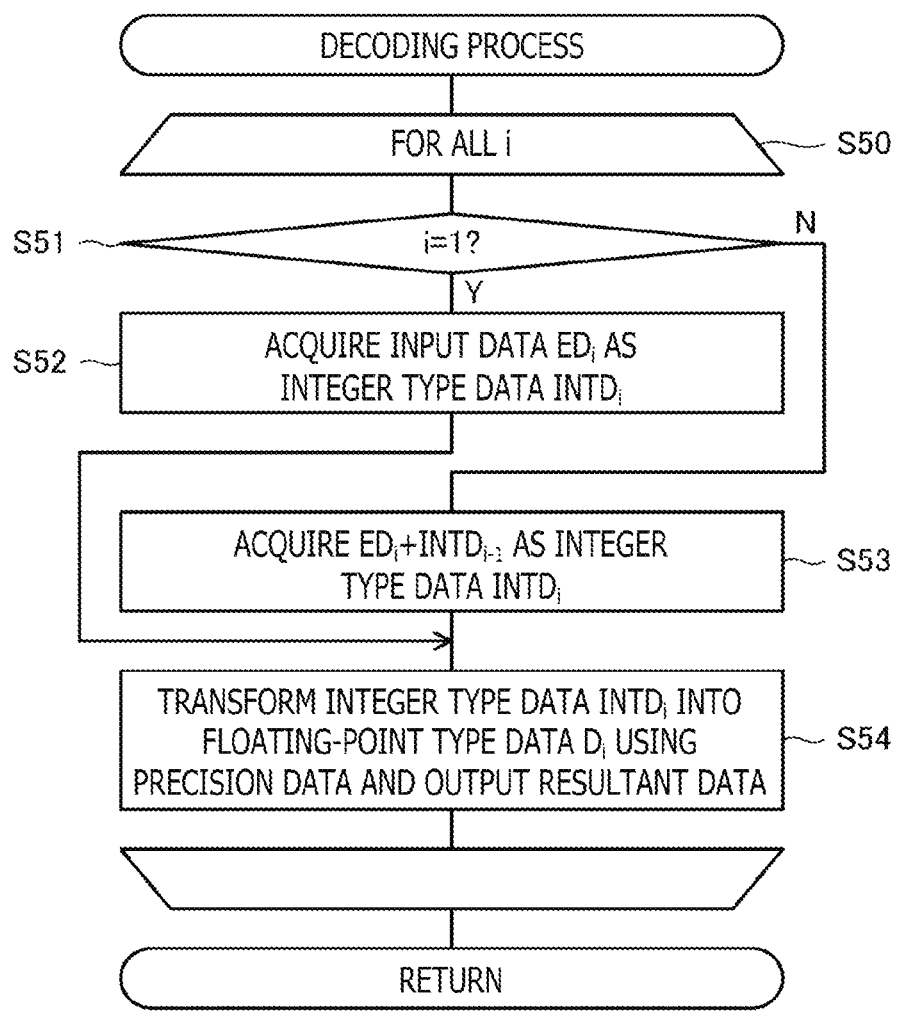
FIG. 13 is a flowchart of a decoding process on position data P and width data W according to an embodiment of the present invention.

FIG. 13 is a flowchart of the decoding process on the position data P. As described later, this decoding process is also used in decoding the width data W. As depicted in FIG. 13, the decoding process is repeatedly executed for one or more input data $ED_i$ ($i \geq 1$) (Step S50). When this decoding process is called in Step S40 of FIG. 12, the one or more input data $ED_i$ is processed into N pieces of coded position data $EP_1$ to $EP_N$.

As for the i-th input data $ED_i$, the digital ink processing section 20 determines first whether or not i is equal to 1 (Step S51), and acquires the input data $ED_i$ as integer type data $INTD_1$ in a case of determining that i is equal to 1 (Step S52). On the other hand, in a case of determining that i is not equal to 1, the digital ink processing section 20 acquires value $ED_i + INTD_{i-1}$ obtained by adding previous integer type data $INTD_{i-1}$ to the input data $ED_i$ as integer type data $INTD_i$ (Step S53).

Next, the digital ink processing section 20 performs a process of transforming the integer type data $INTD_i$ into floating-point type data $D_i$ using the precision data 106 decoded in Step S38 of FIG. 12 and outputting resultant data (Step S54). In Step S40, the data $D_i$ output in this way is acquired as the position data $P_i$.

Reference is made back to FIG. 12. The digital ink processing section 20 having completed the process in Step S40 returns the process to Step S34 and executes decoding of the value of the next tag.

Next, in a case of determining in Step S37 that the value of the tag is 5, the digital ink processing section 20 performs a process of decoding M pieces of width data $W_1$ to $W_M$ from a binary data stored in a region after the tag having value 5 (the second region different from the first region) (Steps S41 and S42; a width data decoding step).

Specifically, in Step S41, the digital ink processing section 20 first performs variable-length decoding of the coded binary data (the second binary data) to obtain N integer type coded values. This process is an inverse process of the process in Step S9 depicted in FIG. 8, and M pieces of coded width data $EW_1$ to $EW_M$ are acquired as a result of this process.

Subsequently, in Step S42, the digital ink processing section 20 restores M pieces of floating-point type width data $W_1$ to $W_M$ by executing the decoding process depicted in FIG. 13 with M pieces of coded width data $EW_1$ to $EW_M$ as one or more input data $ED_i$. A detailed content of the decoding process is the same as that described with reference to FIG. 13.

The digital ink processing section 20 having restored M pieces of width data $W_1$ to $W_M$ compares value M with value N (Step S43). As a result, in a case of determining that M is not smaller than N (or M is equal to N), the digital ink processing section 20 returns the process to Step S34 and tries decoding the value of the next tag. On the other hand, the digital ink processing section 20 having determined that M is smaller than N performs a process of interpolating (M+1)th to N-th width data $W_{M+1}$ to $W_N$ with, for example, M-th width data $W_M$ (Step S44; a width interpolation step). Specifically, the digital ink processing section 20 substitutes a value of the width data $W_M$ into the width data $W_{M+1}$ to $W_N$. It is therefore possible to make all pieces of position data P to correspond to the width data W even in a case in which M is smaller than N and the width data W that correspond to all pieces of position data P are not present. It is noted that the width data W to be substituted is not necessarily the width data $W_M$ but may be any of the width data $W_1$ to $W_M$. After completion of Step S44, the digital ink processing section 20 returns the process to Step S34 and tries decoding the value of the next tag.

As described so far, with the digital ink coding method, the digital ink decoding method, and the data structure according to the present disclosure, the digital ink can be decoded by the same decoding method regardless of whether the digital ink stroke has a fixed width (M=1) or a variable width ($1 < M \leq N$). Furthermore, when at least part of a stroke has a fixed width ($1 < M < N$), compared with a case in which an entire stroke has a variable width (M=N), less than N pieces of width data are required, thus reducing the number of bits of the digital ink.

Furthermore, with the digital ink coding method, the digital ink decoding method, and the data structure according to the present disclosure, the position data P can be coded or decoded per stroke on the basis of the precision data 106 that can vary depending on the coordinate detection device 1 or the stylus 2. Therefore, it becomes possible to place multiple position data P having different levels of precision in one digital ink (file) 100. The same technical advantage is achievable for the width data W and the color data.

For example, with the digital ink coding method, the digital ink decoding method, and the data structure according to the present disclosure, in a case in which the stylus 2 may be a first stylus or a second stylus (e.g., when a first pointing device and a second pointing device may be used), the binary stream BinInk may include, as the third binary data, first precision data indicating precision of the position data P acquired for the first stylus and second precision data indicating precision of the position data P acquired for the second stylus. In this case, in Step S21 of FIG. 9, a series of pieces of position data P acquired for the first stylus are coded using the first precision data, while a series of pieces of position data P acquired for the second stylus are coded using the second precision data. Therefore, a series of pieces of position data P forming a stroke of the first stylus and a series of position data P forming a stroke of the second stylus are respectively coded on the basis of different precision data 106.

Next, a generation process of generating the container file CF, executed by the digital ink processing section 20 depicted in FIG. 1, will be described in detail with reference to FIGS. 14 to 18. In the following, a file generation method according to an Open Packaging Convention (OPC) format described in Non-Patent Document 4 will be described. The OPC is a format of the container file CF in which an XML file group and a non-XML file group (the SVG file, the binary stream BinInk, and the like) are ZIP-archived.

Figure 14:
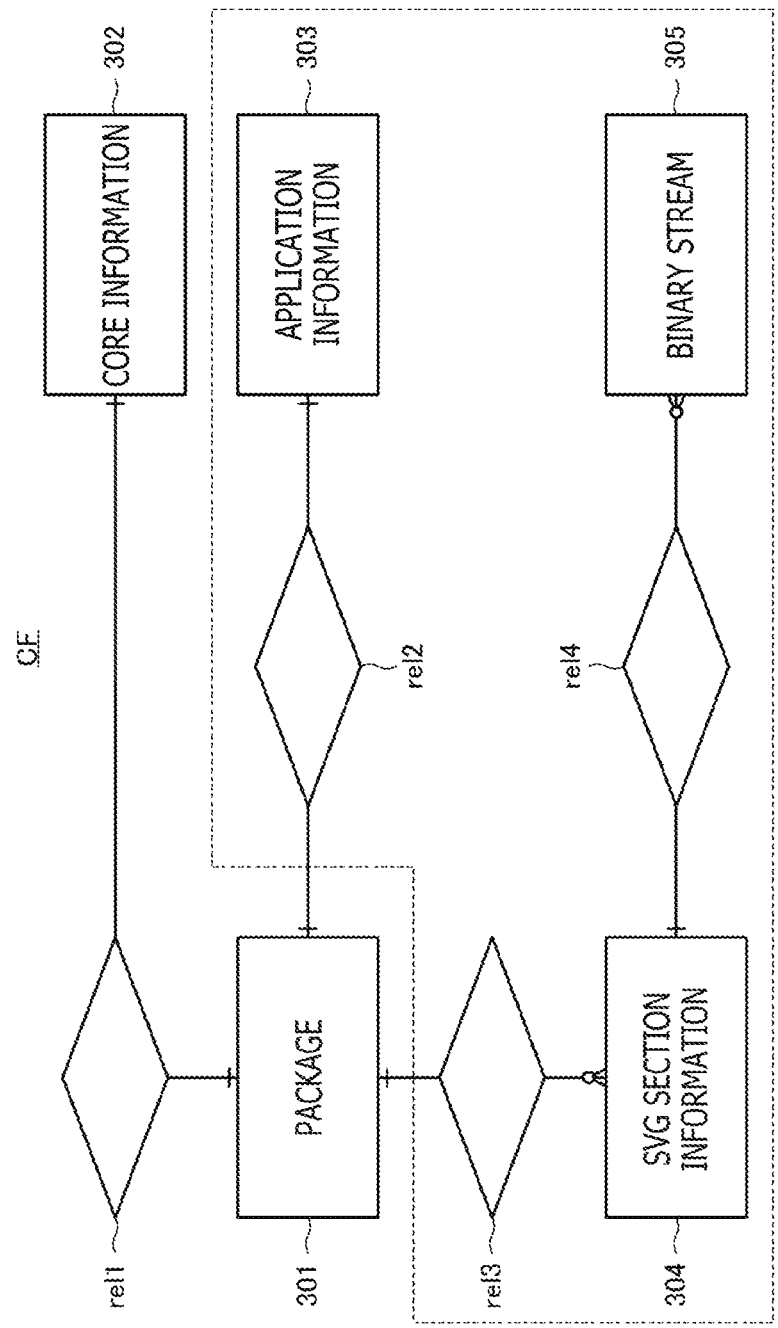
FIG. 14 is an ER diagram explaining entities configuring a container file according to an embodiment of the present invention.

FIG. 14 is an ER diagram explaining entities that form the container file CF. While the notation and cardinality of the ER diagram are the same as those of FIG. 2, each entity denoted by a rectangle in FIG. 14 corresponds to a "package" of the OPC described above and an "OPC part" included in the package.

As depicted in FIG. 14, the container file CF includes, as the entities, a package 301, core information 302, application information 303, SVG section information 304, and a binary stream 305.

The core information 302 is information including general information related to the container file CF and metadata about each file included in this entire package, and corresponds to the package 301 by one-to-one correspondence (relationship re11). The application information 303 is information including information indicating an original application used to generate the container file CF, and corresponds to the package 301 by one-to-one correspondence (relationship re12).

The SVG section information 304 is information including a multimedia content coded in accordance with the SVG and has a relationship re13 with the package 301 by one-to-zero or more correspondence. The binary stream 305 is the binary stream BinInk generated by the digital ink coding method according to the present disclosure and has a relationship re14 with the SVG section information 304 by one-to-zero or more correspondence.

It is noted that the package 301, the core information 302, and the relationship re11 therebetween are specified in the OPC described in Non-Patent Document 4. On the other hand, the other entities and the relationships re12, re13, and re14 (portions surrounded by a broken line) correspond to extensions of the OPC according to the present disclosure.

Figure 15:
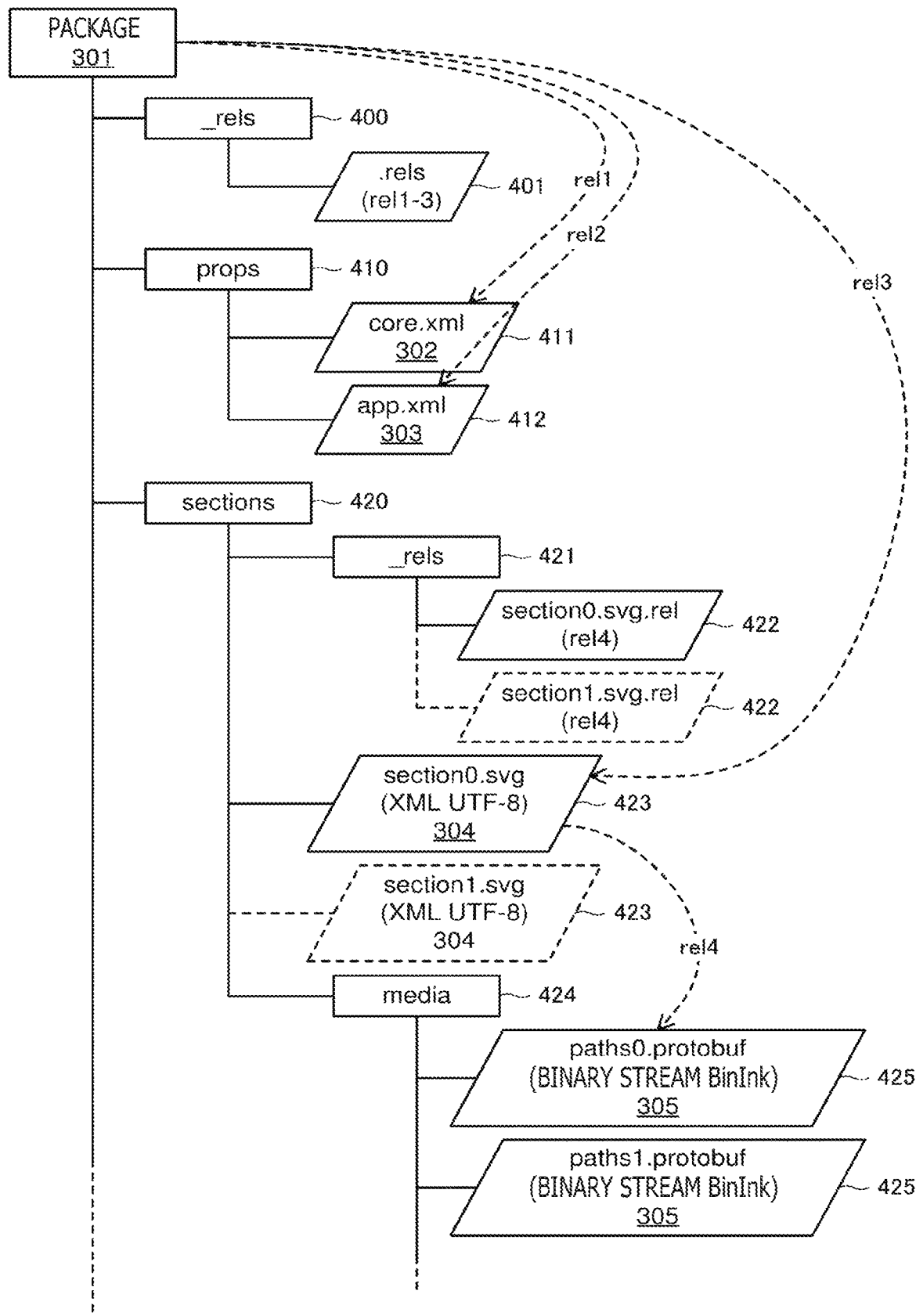
FIG. 15 depicts an example of a configuration of file groups archived in the container file according to an embodiment of the present invention.

FIG. 15 depicts an example of a configuration of the file groups archived in the container file CF. In FIG. 15, a rectangle denotes a directory and a parallelogram denotes a file. As depicted in FIG. 15, the package 301 is a directory as an entity, and configured with three directories of a relationship directory 400 (_rels), a property directory 410 (prop), and a section directory 420 (sections).

The relationship directory 400 includes a relationship file 401 (.rels) indicating relationships (relationships re11, re12, and re13 depicted in FIG. 14) between the package 301 and parts included in the package 301.

FIG. 16A depicts an example of a specific content of the relationship file 401. In FIG. 16A, "/props/core.xml" is a uniform resource identifier (URI) of the core information 302, "/props/app.xml" is a URI of the application information 303, and "/sections/section0.svg" is a URI of the first SVG section information 304. As depicted in FIG. 16A, the relationship file 401 stores identification information (Id), which is used by a computer that later refers to the container file CF to identify information about the container file CF, information (Type) indicating a type of the information, and the URI of the information, with respect to each of the core information 302, the application information 303, and the SVG section information 304. It is noted that the relationship file 401, as well as a relationship file 422 and an SVG file 423 to be described later, are XML files in which XML, data described in accordance with XML, are coded into binary data by a text coding method such as UTF-8.

For example, the relationship file 401 in the example of FIG. 16A includes description that a section (and a content) to which identification information "section0" is allocated is present in the corresponding package 301, that the URI thereof is "/sections/section1.svg" or a position derived from that position, and that metadata indicated at the position "/props/core.xml" is allocated to the section.

With reference back to FIG. 15, the property directory 410 includes an XML, file 411 (core.xml) in which the core information 302 is described and an XML file 412 (app.xml) in which the application information 303 is described. FIG. 16B depicts an example of a specific content of the XML file 411 and FIG. 16C depicts an example of a specific content of the XML file 412. For example, "Author_name_0001" depicted in FIG. 16B indicates information about an author of the container file CF.

The section directory 420 includes a relationship directory 421 (_rels), one or more SVG files 423 (section1.svg, section1.svg) in each of which the SVG section information 304 is described, and a media directory 424 (media). While FIG. 15 depicts two SVG files 423, this is an example only and the number of the SVG files 423 is not limited to two.

The media directory 424 includes one or more binary files 425 (paths0.protobuf, paths1.protobuf) which are one or more binary streams 305 (binary streams BinInk) coded by the digital ink coding method according to the present disclosure. While FIG. 15 depicts two binary files 425, this is an example only and the number of binary files 425 is not limited to two. Furthermore, one or more relationship files 422 (section0.svg.rel, section1.svg.rel) indicating the relationship (relationship re14 depicted in FIG. 14) with one or more binary files 425 are stored in the relationship directory 421 to correspond to the one or more SVG files 423, respectively.

FIG. 17A depicts an example of a specific content of the relationship file 422. For example, in this example, a target ID "strokes0" indicating the binary file 425 "paths0.protobuf" is described, thereby indicating that "paths0.protobuf" corresponds to this relationship file 422. Furthermore, FIG. 17B depicts an example of a specific example of the SVG file 423.

FIG. 18 is a flowchart of a method of generating the container file CF having the structure described above. A generation process of generating the container file CF by the digital ink processing section 20 depicted in FIG. 1 will be described in detail with reference to FIG. 18.

The generation process of generating the container file CF is started first by performing the coding process on the digital ink 100 depicted in FIG. 8 and by obtaining the binary stream BinInk. In other words, the digital ink processing section 20 acquires the binary stream BinInk by coding N pieces of position data P acquired in connection with the motion of the stylus 2 from when the stylus 2 (refer to FIG. 1) is moved down on the surface until when the stylus 2 is moved up from the surface using a first coding method (e.g., the coding method executed in Steps S3, S4, and S7 to S9 of FIG. 8) (Step S60; a first coding step).

Next, the digital ink processing section 20 acquires metadata to be allocated to the binary stream BinInk (author information or the like corresponding to "Author_name_0001" depicted in FIG. 16B) (Step S61), and generates the XML file 411 (Core.xml; first XML file) depicted in FIG. 15 by coding the core information 302 (first XML data) including the metadata using a second coding method (UTF-8 or the like) (Step S62; a first metadata binary generation step).

Subsequently, the digital ink processing section 20 generates XML data (second XML data) indicating a relationship between the target ID indicating the binary stream BinInk acquired in Step S60 and the XML file 411 generated in Step S62 (Step S63), and generates the relationship file 401 (.rels; second XML file) depicted in FIG. 15 by coding the XML data using the second coding method (Step S64; a second metadata binary generation step).

Finally, the digital ink processing section 20 archives the binary stream BinInk acquired in Step S60 and the XML file 411 and the relationship file 401 generated in Steps S62 and S64 in one container file CF (package) (Step S65; a package generation step).

As described above, according to the method of generating a file including the digital ink, the metadata can be allocated to the binary stream, which is generated by coding a series of pieces of position data forming a stroke, by the general-purpose notation such as the XML notation, and the binary stream and the metadata can be archived in one container file CF. It becomes therefore possible for an application to obtain the metadata as long as the application can interpret the XML file stored in the container file CF in an OPC format, even if, for example, the application is incapable of decoding the binary stream BinInk generated by the coding method.

While various embodiments have been described, the present invention is not limited to such embodiments as described and the present invention can be implemented in various modes in a range without departing from the spirit of the present invention.

What is claimed is:

1. A digital ink coding method comprising:
   a coordinate coding step of acquiring a first binary data indicating a series of sets of x coordinate data and y coordinate data by coding N pieces of position data, each including a set of x coordinate data and y coordinate data acquired in connection with a motion of a pointing device during a period determined by a state of the pointing device;
   a width coding step of acquiring a second binary data defining widths at positions indicated by N pieces of position data by coding M pieces of width data, where M is an integer equal to or greater than 1 and equal to or smaller than N and the second binary data is separated from the first binary data; and
   a serialization step of generating a binary stream including the first binary data and the second binary data in mutually different regions.

2. The digital ink coding method according to claim 1, wherein
   the width data indicates that a width of a path indicated by N pieces of position data is a fixed value when M is 1, and is variable when M is equal to or greater than 2 and equal to or smaller than N.

3. The digital ink coding method according to claim 1, wherein
   each of N pieces of position data includes a set of x coordinate data, y coordinate data, and z coordinate data,
   the first binary data is a binary data indicating a series of sets of x coordinate data, y coordinate data, and z coordinate data, and
   M pieces of width data each corresponds to an area of a defined shape at each of positions indicated by N pieces of position data.

4. The digital ink coding method according to claim 3, wherein
   the width data corresponding to the area of the defined shape is indicative of a diameter or a radius of a sphere.

5. The digital ink coding method according to claim 1, further comprising:
   a precision data coding step of generating a third binary data by coding precision data indicating precision of N pieces of position data, wherein
   the coordinate coding step includes coding N pieces of position data using the precision data, and the serialization step includes generating the binary stream including the first binary data, the second binary data, and the third binary data in mutually different regions such that the third binary data is placed ahead of the second binary data in a decoding order.

6. The digital ink coding method according to claim 5, wherein
   the pointing device includes first and second pointing devices,
   the binary stream includes, as the third binary data, first precision data indicating precision of position data acquired for the first pointing device, and second precision data indicating precision of position data acquired for the second pointing device, and
   the coordinate coding step includes coding a series of pieces of position data acquired for the first pointing device using the first precision data, while coding a series of pieces of position data acquired for the second pointing device using the second precision data.

7. A digital ink decoding method for reproducing a path of a pointing device from a binary stream including coded digital ink, the digital ink decoding method comprising:
   a position data decoding step of decoding N pieces of position data acquired in connection with a motion of the pointing device during a period determined by a state of the pointing device from a first region in the binary stream;
   a width data decoding step of decoding M pieces of width data defining widths at positions indicated by N pieces of position data from a second region different from the first region in the binary stream, where M is an integer equal to or greater than 1 and equal to or smaller than N; and
   a width interpolation step of interpolating a width at a position of each of N-M positions, when M is smaller than N, using any of M pieces of width data.

8. The digital ink decoding method according to claim 7, wherein
   the width data indicates that a width of the path indicated by N pieces of position data is a fixed value when M is 1, and is variable when M is equal to or greater than 2 and equal to or smaller than N.

9. A computer-readable non-transitory medium including a digital ink data structure, wherein
   the digital ink data structure includes, in mutually different regions, a first binary data obtained by coding N pieces of position data acquired in connection with a motion of a pointing device during a period determined by a state of the pointing device and a second binary data obtained by coding M pieces of width data defining widths at positions indicated by N pieces of position data, where M is an integer equal to or greater than 1 and equal to or smaller than N, and
   the digital ink data structure is configured to enable decoding of digital ink having the digital ink data structure, wherein the decoding includes:
   restoring N pieces of position data from the first binary data;
   restoring M pieces of width data from the second binary data; and
   associating M pieces of width data with N pieces of position data.

10. A method of generating a file including coded digital ink, the method comprising:
    a first coding step of acquiring a binary stream by using a first coding method to code N pieces of position data acquired in connection with a motion of a pointing device during a period determined by a state of the pointing device;

a first metadata binary generation step of generating a first Extensible Markup Language (XML) file by acquiring metadata for the binary stream and using a second coding method to code first XML data including the metadata;

a second metadata binary generation step of generating a second XML file by generating second XML data indicating a relationship between a target identification information indicative of the binary stream and the metadata and using the second coding method to code the second XML data; and a package generation step of archiving the binary stream, the first XML file, and the second XML file in one package file.

* * * * *